US010923111B1

(12) United States Patent
Fan et al.

(10) Patent No.: US 10,923,111 B1
(45) Date of Patent: Feb. 16, 2021

(54) SPEECH DETECTION AND SPEECH RECOGNITION

(71) Applicant: Amazon Technologies, Inc., Seattle, WA (US)

(72) Inventors: Xing Fan, Redmond, WA (US); I-Fan Chen, Sammamish, WA (US); Yuzong Liu, Bothell, WA (US); Bjorn Hoffmeister, Seattle, WA (US); Yiming Wang, Baltimore, MD (US); Tongfei Chen, Baltimore, MD (US)

(73) Assignee: Amazon Technologies, Inc., Seattle, WA (US)

(*) Notice: Subject to any disclaimer, the term of this patent is extended or adjusted under 35 U.S.C. 154(b) by 140 days.

(21) Appl. No.: 16/368,120

(22) Filed: Mar. 28, 2019

(51) Int. Cl.
*G10L 15/02* (2006.01)
*G10L 15/16* (2006.01)
*G10L 15/26* (2006.01)
*G10L 15/10* (2006.01)
*G10L 17/00* (2013.01)
*G10L 15/08* (2006.01)

(52) U.S. Cl.
CPC ............. *G10L 15/16* (2013.01); *G10L 15/02* (2013.01); *G10L 15/10* (2013.01); *G10L 15/26* (2013.01); *G10L 17/00* (2013.01); *G10L 2015/088* (2013.01)

(58) Field of Classification Search
CPC ......... G10L 15/00–15/34; G10L 17/00–17/26; G10L 19/03–19/038; G10L 19/16–19/67
See application file for complete search history.

(56) References Cited

U.S. PATENT DOCUMENTS

| 4,446,531 | A | * | 5/1984 | Tanaka | G10L 15/00 704/239 |
| 9,558,749 | B1 | | 1/2017 | Secker-Walker et al. | |
| 10,121,467 | B1 | * | 11/2018 | Gandhe | G06F 40/284 |
| 10,373,612 | B2 | | 8/2019 | Parthasarathi et al. | |
| 2006/0085188 | A1 | * | 4/2006 | Goodwin | G11B 27/28 704/245 |
| 2010/0223056 | A1 | | 9/2010 | Kadirkamanathan | |

(Continued)

FOREIGN PATENT DOCUMENTS

| CN | 109155132 A | 1/2019 |
| EP | 3433855 A1 | 1/2019 |

(Continued)

OTHER PUBLICATIONS

Office Action dated Oct. 21, 2019 in Japanese Patent Application No. 2018-549235.

(Continued)

*Primary Examiner* — Abul K Azad
(74) *Attorney, Agent, or Firm* — Pierce Atwood LLP

(57) ABSTRACT

A system configured to recognize text represented by speech may determine that a first portion of audio data corresponds to speech from a first speaker and that a second portion of audio data corresponds to speech from the first speaker and a second speaker. Features of the first portion are compared to features of the second portion to determine a similarity therebetween. Based on this similarity, speech from the first speaker is distinguished from speech from the second speaker and text corresponding to speech from the first speaker is determined.

20 Claims, 19 Drawing Sheets

(56) References Cited

U.S. PATENT DOCUMENTS

| | | | |
|---|---|---|---|
| 2013/0166296 A1 | 6/2013 | Scheller | |
| 2013/0289756 A1* | 10/2013 | Resch | G06F 16/24578 |
| | | | 700/94 |
| 2014/0274203 A1 | 9/2014 | Ganong, III et al. | |
| 2015/0127336 A1 | 5/2015 | Lei et al. | |
| 2015/0294670 A1 | 10/2015 | Roblek et al. | |
| 2016/0019889 A1 | 1/2016 | Alvarez Guevara et al. | |
| 2016/0180838 A1 | 6/2016 | Parada San Martin et al. | |
| 2016/0293167 A1 | 10/2016 | Chen et al. | |
| 2017/0069327 A1 | 3/2017 | Heigold et al. | |
| 2017/0140761 A1 | 5/2017 | Secker-Walker et al. | |

FOREIGN PATENT DOCUMENTS

| | | |
|---|---|---|
| JP | H064097 A | 1/1994 |
| JP | H1152993 A | 2/1999 |
| JP | 2007017733 A | 1/2007 |
| JP | 2012078384 A | 4/2012 |
| JP | 2019-514045 A | 5/2019 |
| WO | 2015153351 A1 | 10/2015 |
| WO | 2017165038 A1 | 9/2017 |

OTHER PUBLICATIONS

The Examiner's attention is hereby drawn to the specification and file history of co-pending U.S. Appl. No. 15/196,228, entitled "Anchored Speech Detection and Speech Recognition", filed Jun. 29, 2016, which may contain information relevant to the present application.

The Examiner's attention is hereby drawn to the specification and file history of co-pending U.S. Appl. No. 16/437,763, entitled "Anchored Speech Detection and Speech Recognition", filed Jun. 11, 2019, which may contain information relevant to the present application.

International Preliminary Report on Patentability from the International Bureau for PCT/US2017/018647, dated Oct. 4, 2018.

International Search Report; dated Jul. 3, 2017; International Application No. PCT/US2017/018647.

Yu-An Chung, et al., "Audio Word2Vec: Unsupervised Learning of Audio Segment Representations using sequence-to-sequence Autoencoder"; arxiv. org; Cornell University Library, 201 Olin Library Cornell University Ithaca, NY; Mar. 3, 2016; XP080686952, the whole document.

Variani, et al., "Deep Neural Networks for Small Footprint Text-dependent Speaker Verification." Acoustics, Speech and Signal Processing (ICASSP), 2014 IEEE International Conference on IEEE, 2014.

Dehak, et al., "Front-end Factor Analysis for Speaker Verification," IEEE Transactions on Audio, Speech, and Language Processing, vol. 19, No. 4, 2011, pp. 788-798.

Saon, et al., "Speaker Adaptation of Neural Network Acoustic Models Using i-Vectors.," in ASRU, 2013, pp. 55-59.

Liu, et al., "Efficient Cepstral Normalization for Robust Speech Recognition," Proceedings of the Workshop on Human Language Technology, Association for Computational Linguistics, 1993, pp. 69-74.

Leggetter, et al., "Maximum Likelihood Linear Regression for Speaker Adaptation of Continuous Density Hidden Markov Models," Computer Speech & Language, vol. 9, No. 2, 1995, pp. 171-185.

Maas, et al., "Anchored Speech Detection," INTERSPEECH, 2016, pp. 2963-2967.

King, et al., "Robust Speech Recognition via Anchor Word Representations," INTERSPEECH, 2017, pp. 2471-2475.

Graves, "Sequence Transduction with Reecurrent Neural Networks," arXiv preprint arXiv:1211.3711, Nov. 14, 2012.

Graves, et al. "Towards End-to-End Speech Recognition with Recurrent Neural Networks," International Conference on Machine Learning, 2014, pp. 1764-1772.

Chorowski, et al., "Attention-based Models for Speech Recognition," Advances in Neural Information Processing Systems, 2015, pp. 577-585.

Chan, et al., "Listen, Attend and Spell: A Neural Network for Large Vocabulary Conversational Speech Recognition," Acoustics, Speech and Signal Processing (ICASSP), 2016 IEEE International Conference on. IEEE, 2016, pp. 4960-4964.

Chang, et al., "Very Deep Convolutional Networks for End-to-End Speech Recognition," Acoustics, Speech and Signal Processing (ICASSP), 2017 IEEE International Conference on. IEEE, 2017, pp. 4845-4849.

Chiu, et al., "State-of-the-art Speech Recognition with Sequence-to-sequence Models," 2018 IEEE International Conference on Acoustics, Speech and Signal Processing (ICASSP). IEEE, 2018, pp. 4774-4778.

Bahdanau, et al., "Neural Machine Translation by Jointly Learning to Align and Translate," arXiv preprint arXiv: 1409.0473, 2014.

Graves, et al., "Connectionist Temporal Classification: Labelling Unsegmented Sequence Data with Recurrent Veural Networks," Proceedings of the 23rd International Conference on Machine Learning, ACM, 2006, pp. 369-376.

Shin, et al., "Speech/non-speech Classification Using Multiple Features for Robust Endpoint Detection," Acoustics, Speech, and Signal Processing, 2000, ICASSP'00, Proceedings, 2000 IEEE International Conference on. IEEE, 2000, vol. 3, pp. 1399-1402.

Li, et al., "Robust Speech Endpoint Detection Based on Improved Adaptive Band-partitioning Spectral Entropy," International Conference on Life System Modeling and Simulation, Springer, 2007, pp. 36-45.

Shannon, et al., "Improved End-of-Query Detection for Streaming Speech Recognition", Interspeech, 2017, pp. 1909-1913.

Maas, et al., "Combining Acoustic Embeddings and Decoding Features for End-of-Utterance Detection in Real-Time Far-Field Speech Recognition Systems," 2018 IEEE International Conference on Acoustics, Speech and Signal Processing (ICASSP), IEEE, 2018, pp. 5544-5548.

Kuchaiev, et al., "Openseq2seq: Extensible Toolkit for Distributed and Mixed Precision Training of Sequence-to-Sequence Models", arXiv preprint arXiv:1805.10387, 2018.

Hochreiter, et al., "Long short-term memory", Neural Computation, vol. 9, No. 8, 1997, pp. 1735-1780.

Kingma, et al., "Adam: A Method for Stochastic Optimization." arXiv preprint arXiv:1412.6980, 2014.

Parveen, et al., "Speaker Recognition with Recurrent Neural Networks", retrieved from ISCA Archive http://www.isca-speech.org/archive, 6th International Conference on Spoken Language Processing (ICSLP 2000), Beijing, China Oct. 16-20, 2000.

Heigold, et al., "End-to-End Text-Dependent Speaker Verification", Acoustics, Speech and Signal Processing (ICASSP), 2016 IEEE International Conference on. IEEE, 2016.

Hossain, et al., "A Real Time Speaker Identification Using Artificial Neural Network." Computer and Information Technology, 2007, ICCIT 2007, 10th International Conference on. IEEE, 2007.

European Office Action dated Oct. 30, 2018 for European Patent Application No. 17708642.8, 3 pages.

Non-Final Office Action dated Jun. 23, 2017 for counterpart U.S. Appl. No. 15/196,228, entitled "Anchored Speech Detection and Speech Recognition", filed Jun. 29, 2016, 7 pages.

Final Office Action dated Dec. 22, 2017 for counterpart U.S. Appl. No. 15/196,228, entitled "Anchored Speech Detection and Speech Recognition", filed Jun. 29, 2016, 8 pages.

Non-Final Office Action dated Nov. 30, 2018 for counterpart U.S. Appl. No. 15/196,228, entitled "Anchored Speech Detection and Speech Recognition", filed Jun. 29, 2016, 8 pages.

* cited by examiner

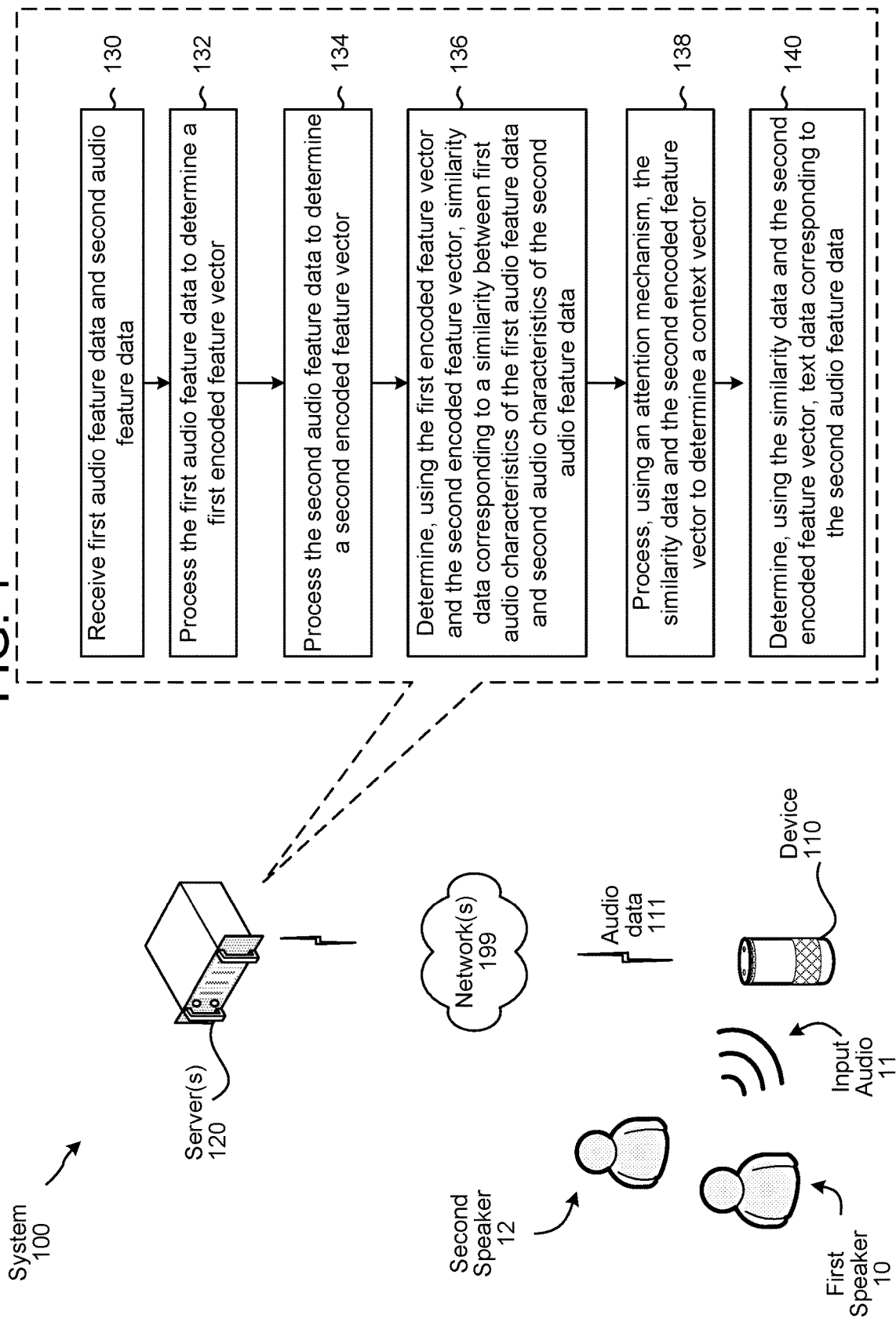

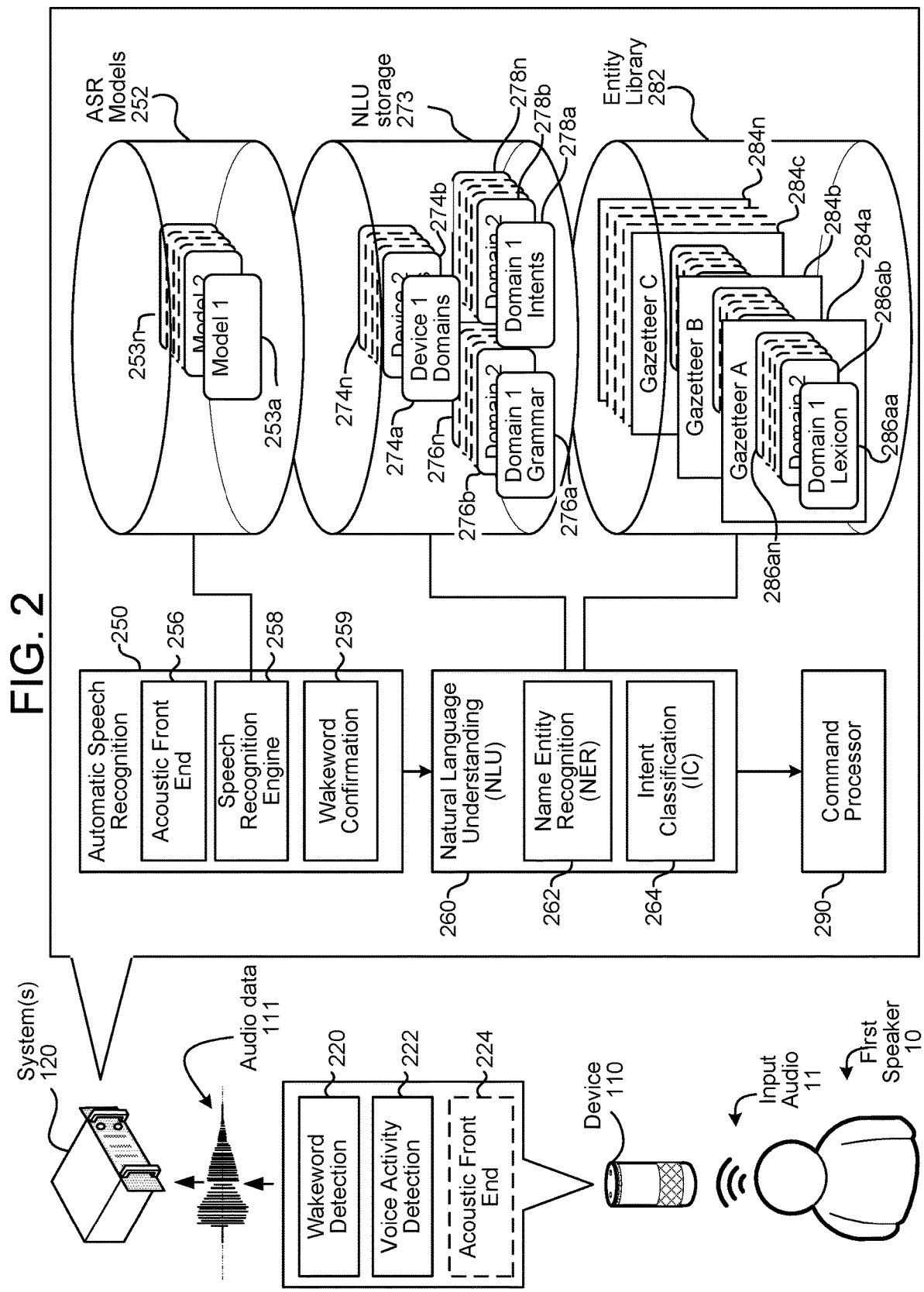

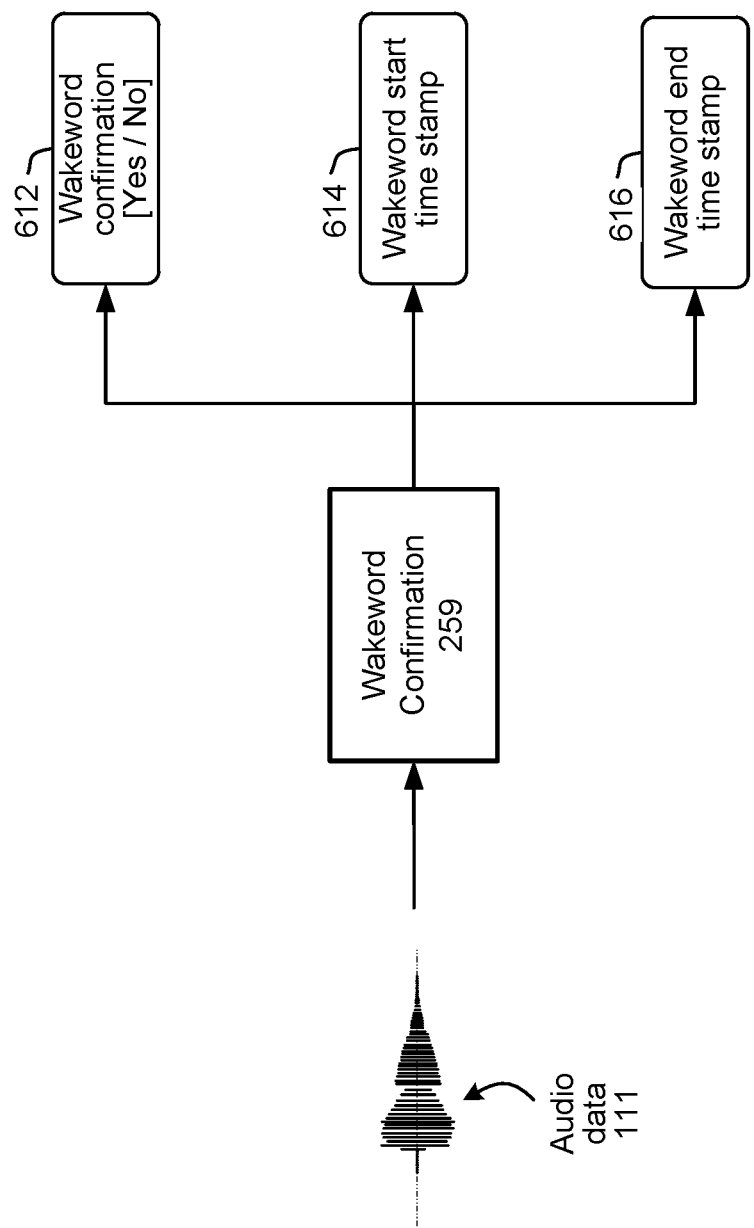

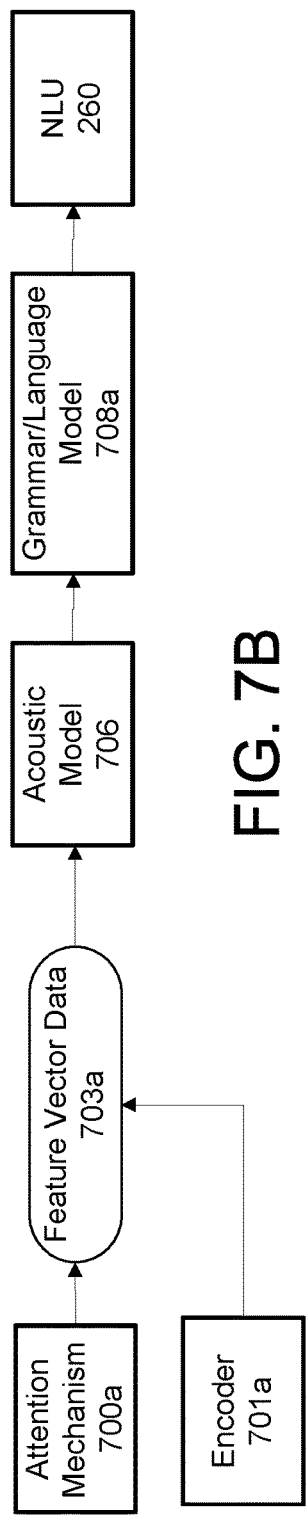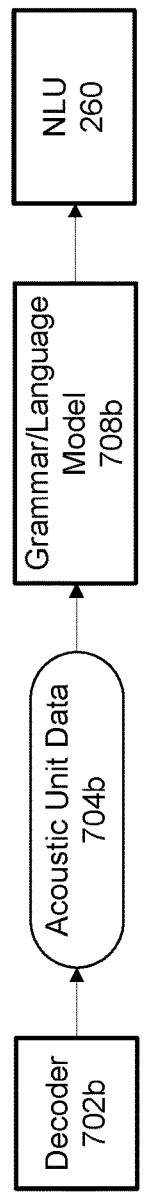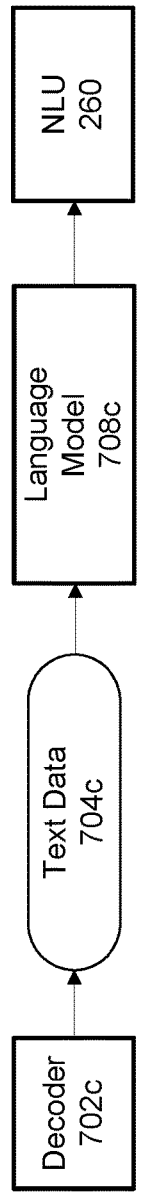

SPEECH DETECTION AND SPEECH RECOGNITION

BACKGROUND

Speech-recognition systems allow humans to interact with computing devices using speech. Such systems employ techniques to identify words spoken by a human user based on the various features of received audio. Automatic speech recognition (ASR) combined with natural-language understanding (NLU) processing techniques enable a computing device to perform actions based on the user's spoken commands and/or convert a user's speech into text data, which may then be provided to various software applications. The combination of ASR and NLU processing techniques may be referred to as speech processing. Speech processing may be used by computers, hand-held devices, telephone computer systems, kiosks, automobiles, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for performing speech recognition according to embodiments of the present disclosure.

FIG. 2 is a diagram of a speech processing system according to embodiments of the present disclosure.

FIG. 6C illustrates a system component configured confirm detection of a wakeword according to embodiments of the present disclosure FIGS. 7A, 7B, and 7C illustrate components of a speech processing system according to embodiments of the present disclosure.

DETAILED DESCRIPTION

Figure 3A:
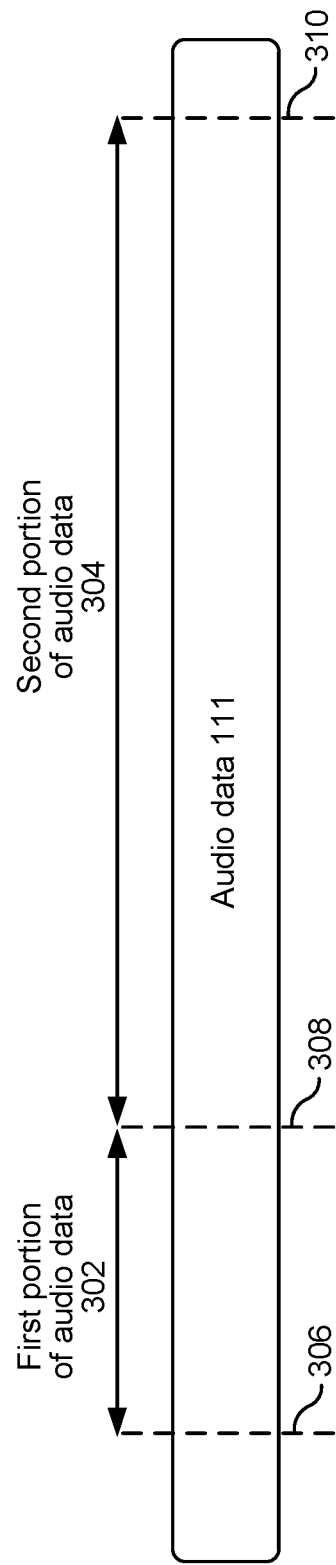
FIGS. 3A and 3B illustrate audio data having a first portion and a second portion according to embodiments of the present disclosure.

Automatic speech recognition (ASR) is a field of computer science, artificial intelligence, and linguistics that relates to transforming audio data associated with speech into text representative of that speech. Natural language understanding (NLU) is another field of computer science, artificial intelligence, and linguistics that relates to enabling computers to derive meaning from text input containing natural language. ASR and NLU are often used together as part of a speech-processing system.

ASR and NLU can be computationally expensive—i.e., significant computing resources may be needed to process ASR and NLU within a reasonable time. Because of this computational expense, a distributed-computing environment may be used to perform speech processing. A distributed-computing environment may include a local device having one or more microphones configured to capture speech from a user and convert this speech into audio data—i.e., the sound comprising the speech may be converted to audio data (for example, pulse-code modulation (PCM) audio data) representing the speech. The audio data may then be sent, via a network, to a remote device for further processing, such as speech processing. A command represented by the audio data may then be executed by the remote and/or local device(s).

An environment in which a command is spoken may, however, be crowded, loud, or otherwise noisy in a manner that may interfere with speech processing. For example, a first speaker may speak an utterance including a command, but the device capturing the user's utterance may be in an environment in which a second speaker is also speaking. The speech-processing system may have difficulty in such situations identifying speech corresponding to the first speaker (i.e., the desired speaker) so that speech recognition may be performed on that desired audio rather than on speech from the second speaker. The speech captured from the second speaker may be included in the command, rendering execution of the command inaccurate or incomplete.

Offered is a system and method that improves the ability of a system to identify speech from the first speaker during an interaction with the speaker in a manner that does not significantly impact latency yet still allows the system to distinguish desired speech of the first speaker from undesired speech of the second speaker. In various embodiments, a speech processing system included an automatic speech recognition (ASR) component and a natural language understanding (NLU) component. The ASR component identifies a first portion of audio data corresponding to an utterance; this first portion may represent speech from the desired speaker and may include a representation of a wakeword. Presence of the wakeword may be determined by a wakeword detector which, as explained herein, compares the audio data to a stored representation of the wakeword and determines a similarity score corresponding to the likelihood that the audio data represents the wakeword.

The system and method may then determine a degree of similarity between the first portion of the audio data and other portions of the audio data by, for example, processing first frames of audio corresponding to the first portion of the audio data to determine first utterance features corresponding to the wakeword and then processing second frames of audio corresponding to the other portions of the audio data to determine second utterance features corresponding to the rest of the utterance. An attention mechanism (a component that can apply weights to emphasize or de-emphasize data based on its relative importance to an operation) then determines weights based on a degree of similarity and applies the weights to an encoded feature vector to emphasize other portions of the utterance that correspond to the first portion (from, e.g., the desired speaker) and to de-emphasize other portions of the utterance that correspond to other speakers and/or noise. Using the weighted output of the attention mechanism, a decoder determines output data that includes a representation of speech from the desired speaker and that does not include representations for the other speech and/or noise.

An encoder receives input data, such as audio feature data corresponding to audio, and determines, for each of a plurality of time steps, a next state based on the input data and/or a previous state. A decoder determines output data, such as text data corresponding to the audio, based on a state of the encoder. An attention mechanism may include one or more layers of a neural network model disposed between the encoder and decoder. The attention mechanism receives one or more outputs of the encoder from one or more time steps and modifies those outputs in accordance with one or more weights correspond to the degree of similarity. A decoder receives the modified output and determines its next state based thereon. The attention mechanism thus allows the decoder to determine its output on not just a last state of the encoder, but on a weighted sum of a plurality of prior states. Based on the weights, the decoder may thus "attend" to different prior states of the encoder as well as a current state. The decoder may output text data, feature vectors, and/or acoustic units, such as phonemes, that represent a possible action and/or response to a command or request expressed in the utterance. This output data may be further processed by additional speech-processing components, such as an acoustic model, grammar model, and/or language model, and then by a natural-language understanding component to determine the action and/or response to the command or request.

FIG. 1 shows a system 100 configured to perform speech processing using speaker detection according to embodiments of the disclosure. Although FIG. 1, and other figures and discussion herein, may illustrate operation of the system in a particular order, the steps described may be performed in a different order (as well as certain steps removed or added) without departing from the intent of the disclosure. As shown in FIG. 1, a system 100 may include one or more devices 110 local to a first speaker 10 and a second speaker 12, as well as one or more networks 199 and one or more systems 120 connected to device 110 using the network(s) 199. The system 120 (which may be one or more different physical devices) may be capable of performing speech processing (such as ASR, NLU, and query parsing) as described herein. A single system 120 may perform the speech processing, or multiple system 120 may combine to perform the speech processing. Further, the system 120 may be configured to execute certain commands, such as answering queries spoken by the first speaker 10. In addition, certain speech-detection or command-execution functions may be performed by device 110.

As shown in FIG. 1, the device 110 receives audio input 11 corresponding to an utterance from a first speaker 10 local to the device 110. The input audio 11 may also include speech from a second speaker 12 who is also local to device 110 and/or other noise. The device 110 may convert the audio 11 into audio data 111 and send the audio data to the system 120. The system 120 may then receive the audio data 111 corresponding to the spoken command via the network 199 and may, using an acoustic front end, determine audio feature data corresponding to the audio data 111 and that a first portion of the audio data includes a representation of a wakeword and that a second portion of the audio data includes a representation of other speech.

The system 120, as described above, determines output data, such as text data, acoustic unit data, and/or feature vector data, corresponding to the audio data 111 using the attention mechanism to distinguish between portions of the audio data 111 that correspond to speech of a first, desired speaker and portions of the audio data that correspond to speech of a second speaker and/or noise. The output data thus includes text or other data representing speech of the desired speaker and omits text or other data representing speech of the second speaker and/or noise. The system 120 receives (130), from the acoustic front end or other source, first audio feature data corresponding to the first portion and second audio feature data corresponding to the second portion. The system 120 processes (132) the first audio feature data to determine a first encoded feature vector and processes (134) the second audio feature data to determine a second encoded feature vector. The system 120 determines (136), using the first encoded feature vector and the second encoded feature vector, similarity data corresponding to a similarity between first audio characteristics of the first audio feature data and second audio characteristics of the second audio feature data. The system 120 processes (138), using the attention mechanism, the similarity data and the second encoded feature vector to determine a data vector, which may be a context vector representing information corresponding to the utterance, such as words, sounds, phrases, or entities represented in the utterance. The system 120 then determines (140), using the similarity data and the second encoded feature vector, text data corresponding to the second audio feature data. The system 120 may then perform NLU on the text data and execute a command based thereon, which may correspond to the spoken utterance of the desired user 10.

Further details of performing ASR and NLU are discussed below, following a discussion of the overall speech-processing system of FIG. 2. FIG. 2 is a diagram of a system for processing a spoken utterance to determine and act on commands or requests spoken by a user, such as spoken commands that may follow a wakeword. The various components illustrated may be located on a same or different physical devices. Communication between various components illustrated in FIG. 2 may occur directly or across a network 199.

An audio-capture component, such as a microphone of device 110, captures audio 11 corresponding to a spoken utterance. The device 110, using a wakeword-detection component 220, may then process audio data corresponding to the audio to determine if a wakeword is represented in the audio data. Following detection of the wakeword, the device may send audio data 111 corresponding to the utterance to a system 120 that includes an ASR component 250. The audio data 111 may be processed by an acoustic front-end component 224 located on the device 110 prior to transmission; instead or in addition, the audio data 111 may be processed by an acoustic front-end component 256 located on the system 120.

The wakeword-detection component 220 may detect wakewords in the audio 11. For example, the device 110 may convert audio 11 into audio data and process the audio data with the wakeword-detection component 220 to determine whether the wakeword is detected by comparing the audio data to an audio signature and/or model corresponding to a particular wakeword.

In some embodiments, the device 110 may use various techniques to determine whether the audio data includes speech prior to determining if the audio data includes the wakeword. Some embodiments may apply these voice-activity detection (VAD) techniques using a voice-activity detector 222. Such techniques may determine whether speech is present in an audio input based on various quantitative aspects of the audio input, such as spectral slopes between one or more frames of the audio input; the energy levels of the audio input in one or more spectral bands; and/or the signal-to-noise ratios of the audio input in one or more spectral bands. In other embodiments, the device 110 may include a classifier configured to distinguish speech from background noise. The classifier may be implemented by techniques such as linear classifiers, support vector machines, and decision trees. In other embodiments, Hidden Markov Model (HMM) or Gaussian Mixture Model (GMM) techniques may be applied to compare the audio input to one or more acoustic models in speech storage; the acoustic models may include models corresponding to speech, noise (such as environmental noise or background noise), or silence.

After voice activity is detected in the audio received by the device 110, the device 110 may use the wakeword-detection component 220 to perform wakeword detection and thereby determine that a user intends to speak a command to the device 110. This process may also be referred to as keyword detection, with the wakeword being a specific example of a keyword. Wakeword detection may be performed without performing linguistic analysis, textual analysis, or semantic analysis. Instead, audio data corresponding to captured audio is analyzed to determine if specific audio characteristics of the audio match preconfigured acoustic waveforms, audio signatures, or other data to determine if the audio matches a stored representation of the wakeword.

Thus, the wakeword-detection component 220 may compare audio data to stored models or data to detect a wakeword. One approach for wakeword detection applies large-vocabulary continuous speech-recognition (LVCSR) systems to process the audio signals, with wakeword searching conducted in the resulting lattices or confusion networks. Another approach for wakeword detection includes hidden Markov models (HMM) that represent wakeword and non-wakeword speech. The non-wakeword speech may include, for example, other spoken words or other background noise. There may be one or more HMMs built to model the non-wakeword audio characteristics. Viterbi decoding may be used to search the best path in a HMM decoding graph, and the decoding output may be further processed to make the decision on keyword presence. In some embodiments, the wakeword detection component 220 may include a deep neural network (DNN) or a recurrent neural network (RNN), which may not include a HMM. Such a system may estimate the posteriors of wakewords with context information by, for example, stacking frames within a context window. Posterior threshold tuning or smoothing may be applied for decision making.

Once the wakeword is detected, the local device 110 may "wake" and begin transmitting audio data 111 corresponding to input audio 11 to the system 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

Upon receipt by the server(s) 120, the system 100 may use various techniques for determining the beginning ("beginpoint") and end ("endpoint") of speech to be processed. The beginpoint of the speech may be determined by the device 110, and the endpoint of the speech may be determined by the system 120 (after receipt of corresponding audio data from the device 110); in other embodiments, different components may perform the beginpointing and/or endpointing without diverging from the present disclosure. In some embodiments, as explained in greater detail below, a wakeword-confirmation component 259, which may reside with system(s) 120, performs the beginpointing and/or endpointing.

In some embodiments, the system 120 may determine pauses in spoken words and may interpret those pauses as potential breaks in a conversation. Breaks in a conversation may be considered as breaks between utterances and thus considered the beginning (beginpoint) or end (endpoint) of an utterance. The beginning and/or end of an utterance may also be detected using speech and/or audio characteristics by determining, for example, that one set of audio characteristics corresponds to a first speaker while a second set of audio characteristics corresponds to a second speaker. Other techniques may also be used to determine the beginning of an utterance or end of an utterance. Beginpointing and/or endpointing may be based, for example, on the number of silence/non-speech audio frames—e.g., a number of consecutive silence and/or non-speech frames. For example, some systems may employ energy-based or acoustic-model-based VAD techniques that differentiate between speech and non-speech using, as discussed above with reference to voice detection, various quantitative aspects of the audio input, such as the spectral slope between one or more frames of the audio input; the energy levels (such as a volume, intensity, amplitude, etc.) of the audio input in one or more spectral bands; zero-crossing rate; the signal-to-noise ratios of the audio input in one or more spectral bands; or other quantitative aspects. These factors may be compared to one or more thresholds to determine if a break in speech has occurred. Such a threshold may be determined according to user input or may be set by a device. In some embodiments, the beginpointing and/or endpointing may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The beginpointing and/or endpointing may compare the energy level to the energy level threshold (and optionally to the threshold duration) to determine whether the energy level threshold is met.

In certain embodiments, HMM or GMM techniques may be applied to compare the audio input to one or more acoustic models, which may include models corresponding to speech, noise (such as environmental noise or background noise), or silence and/or non-speech. Non-speech frames may not necessarily represent complete silence (for example, certain noise may still be present in the audio), but the frames may lack audio characteristics typical of speech and thus may be deemed to be non-speech frames. Still other techniques may be used to determine whether speech begins and/or ends in the input audio data.

The length of a pause sufficient to qualify the pause as a beginpoint/endpoint may depend on the identity of the speaker. If the system is configured to perform speaker identification, the system may identify the speaker and adjust the pause length sufficient to determine an endpoint accordingly. The system may also be configured to learn pause tendencies of different speakers and to adjust its endpointing processing accordingly. For example, during system training/enrollment, a speaker's pause tendencies between utterances or between topics may be recorded and used to train the endpointing processing of the system. Such tendencies may also be recorded at runtime and used to further adjust the system. Different pause lengths may also be used for different spoken languages because the pause length may vary depending on the language. The begin and/or end of an utterance may also be determined by various audio characteristics of the speech including pitch, prosody, volume, rhythm, stress, intonation, cepstrum, etc., which may be determined by audio and/or speech processing components. For example, a rising or falling tone of a voice may indicate a new utterance, the end of a command, etc. The system may train on voice characteristics (which may or may not be also tied to speaker identity) that indicate when an utterance ends, and thus when an end of the speech should be marked by the system. These techniques may be used to modify and/or customize a language and/or grammar model, such that expected pauses in the language model(s) may be based on an identity of a speaker.

Using variations of the techniques described above, the beginpointing and/or endpointing may determine a confidence level whose value corresponds to a likelihood that the location of the point in question (i.e., the point in the audio data at which the beginpointing/endpointing occurs) represents the start/end of an utterance/command. The confidence score may depend on factors such as the technique used to determine the marker, the length of the pause, the speaker identity, etc. For example, if the confidence level satisfies a confidence-level threshold, it may be determined that a detected silence is sufficient (e.g., the length of a pause in the speech exceeds a threshold), that speech is present in the audio input, and that an utterance begin and/or end may be marked. If the confidence level does not satisfy the confidence level, however, the system may determine that there is no speech in the audio input.

Once a wakeword and/or beginpoint is detected, the device 110 may begin sending audio data to the system 120. The system 120 may continue speech processing using the audio data until an endpoint is detected. The audio data from the beginpoint to the endpoint is thus processed by the system 120 when performing the speech processing for the utterance.

In certain configurations, the process for endpointing may be similar to the process for beginpointing as discussed above. One difference between endpointing and beginpointing is, however, that during endpointing, the system may have some knowledge of the contents of the utterance that is being endpointed. Thus, while beginpointing may sometimes occur when there is no prior speech, endpointing occurs when there is prior speech, namely the speech of the utterance whose endpoint is being detected.

Once audio data corresponding to speech is identified, an ASR component 250 may convert the audio data 111 into text. The ASR component 250 may generate text data, corresponding to the audio data, that represents the words, numbers, or other information represented by the audio data. The text data may then be used by other components for various purposes, such as executing system commands, inputting data, etc. The ASR component 250 may process the audio data based using one or models 253 stored in an ASR model storage 252. The models 253 may include, for example, acoustic models, language models, or other models that may be used to recognize words in a spoken utterance. For example, the ASR component 250 may encode the audio data 111 with an encoder, process the encoded audio data with an attention mechanism, and decode the attended, encoded audio data with a decoder.

The different ways in which a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds and the likelihood that a particular word which matches the sounds would be included in the sentence at the specific location (e.g., using a language or grammar model). Thus each potential textual interpretation of the spoken utterance (hypothesis) may be associated with a confidence score. Based on the considered factors and the assigned confidence score, the ASR component 250 may output the most likely text recognized in the audio data 111. The ASR component 250 may also output multiple hypotheses in the form of a lattice or an N-best list in which each hypothesis corresponds to a confidence score or other score (such as a probability score).

The device 110 and/or system 120 may include an acoustic front-end 256 and a speech-recognition engine 258. The acoustic front-end 256 transforms the audio data from, e.g., a microphone, into audio data, such as feature vector(s), for processing by the speech-recognition engine 258. The speech-recognition engine 258 processes the audio data with one or more models 253 and/or other data models and information to recognizing the speech represented in the audio data. The acoustic front-end 256 may reduce noise in the audio data and may divide the audio data into frames representing time intervals, for which the acoustic front-end 256 may determine a number of values, called features, representing the qualities of the audio data, along with a set of those values, called an audio feature vector, representing the features/qualities of the audio data within the frame. In some embodiments, each audio frame corresponds to 25 milliseconds of audio, and the frames begin at 10 millisecond intervals; adjacent audio frames therefore each include 15 milliseconds of overlapping audio. Many different features for a particular frame may be determined, and each feature may represent some quality of the audio. A number of approaches may be used by the acoustic front-end to process the audio data, such as mel-frequency cepstral coefficients (MFCCs), perceptual linear predictive (PLP) techniques, neural-network feature vector techniques, linear-discriminant analysis, and/or semi-tied covariance matrices. The acoustic front-end may create an audio feature vector that includes some or all of the above-described data representing one or more audio frames.

Alternatively or in addition, post front-end processed data (such as audio feature vectors) may be received by the speech-recognition engine 258 from a source other than the internal acoustic front-end 256. For example, the device 110 may process audio data and create audio feature vectors (using, for example, an acoustic front-end disposed on the device 110) and transmit that information to the system 120. Audio-feature vectors may arrive at the system 120 encoded, in which case they may be decoded prior to processing by the speech-recognition engine 258.

The ASR engine 258 attempts to match received feature vectors to language phonemes and words as known in the stored acoustic models and language models. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

As discussed above, input audio data 111 may be processed by a wakeword-detection component 220 on the device 110 to identify a wakeword in the input audio data 111. A wakeword-confirmation component 259 on the system 120 may further process the audio data to confirm that the wakeword is detected or not detected in the audio data 111. If the wakeword is detected, the input audio data may be passed to a downstream component (such as an NLU component 260) for further processing. The wakeword-confirmation component 259 may determine timestamps corresponding to the wakeword start time and wakeword end time in the input audio data 111. The timestamps may be indicators of start and/or end frames, audio feature vectors corresponding to the wakeword, or other indicators of start/end time for the wakeword.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR to interpret the utterance. For example, the ASR process may use an acoustic model to compare the input audio data (or corresponding feature vectors) with models for sounds (e.g., subword units or phonemes) and sequences of sounds to identify words that match the sequence of sounds spoken in the utterance of the audio data. Indicators of those sounds may then be passed to a grammar/language model to determine words from those sounds and/or sentences from those words.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

Following ASR processing, the ASR component 250 may sent its output to other processing components, such as an NLU component 260, which may be on the system 120 and/or on other systems distributed across the network(s) 199. For example, the ASR component 250 may send a textual representation of the speech, an N-best list including multiple hypotheses and respective scores, and/or a lattice representing the speech to the NLU component 260.

The NLU component 260 may include various additional components, such as a named-entity recognition (NER) component 262, an intent-classification (IC) component 264, a result-ranking and distribution component, and/or NLU storage 273. The NLU component 260 may also utilize gazetteer information 284*a*-284*n* stored in an entity library storage 282. The gazetteer information 284*a*-284*n* may be used for entity resolution, which may include matching ASR results with different entities (such as song titles, contact names, etc.) Gazetteers may be linked to users (for example, a particular gazetteer may be associated with a specific user's music collection) and/or may be linked to certain domains (such as shopping).

The NLU component 260 receives text data (such as text data generated by the ASR component 250) and attempts to make a semantic interpretation of the text. That is, the NLU component 260 determines the meaning behind the text data based on the words represented in the text data. The NLU component 260 may process the text data to derive an intent or a desired action, as well as the pertinent pieces of information in the text data that allow a device (e.g., device 110) to perform that action. For example, if a spoken utterance is processed using the ASR component 250 and outputs the text "call mom" the NLU process may determine that the user intended to initiate communications with a contact matching the entity "mom."

The NLU component 260 may process several textual inputs related to the same utterance. For example, if the ASR component 250 outputs N text segments (as part of an N-best list), the NLU component 260 may process all N outputs to obtain NLU results.

The NLU component 260 may be configured to annotate text data as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To perform NLU processing of speech input, the NLU component 260 may be configured to determine a "domain" of the utterance so as to determine and/or narrow down which services offered by the endpoint device (e.g., the system 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named-entity recognition component 262 may receive a query in the form of ASR results and may attempt to identify relevant grammars and lexical information that may be used to construe meaning. To do so, the named-entity recognition component 262 may identify potential domains that may relate to the received query. The NLU storage 273 may include device-domain databases 274a-274n identifying domains associated with specific devices. For example, the device 110 may be associated with domains for music, telephony, calendaring, contact lists, and/or device-specific communications. In addition, the entity library 282 may include database entries corresponding to specific services on a specific device; these entries by be indexed by identification information corresponding to the device, such as a device identification number.

A domain may represent a discrete set of activities having a common theme, such as "shopping," "music," and/or "travel." Each domain may be associated with a particular language model and/or grammar database 276a-276n, a particular set of intents/actions 278a-278n, and/or a particular personalized lexicon 286. Each gazetteer 284a-284n may include domain-indexed lexical information associated with a particular user and/or device. For example, a first gazetteer A 284a may include domain-index lexical information 286aa-286an. A user's music-domain lexical information may include album titles, artist names, and song names, for example, whereas a user's contact-list lexical information may include the names of contacts. Because every user's music collection and contact list may be different, this personalized information may improve entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) component 264 may parse the query to determine one or more intent for each identified domain, in which the intent corresponds to the action to be performed that is responsive to the query. Each domain may be associated with a domain-intent database 278a-278n of words linked to intents. For example, a music-intent database may link words and phrases such as "quiet," "volume off," and "mute" to a "mute" intent. The IC 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 260 may parse the query to identify words as subject, object, verb, preposition, etc., based on grammar rules and models, prior to recognizing named entities. An identified verb may be used by the IC component 264 to identify intent, which may then be used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 260 then searches the corresponding fields in the domain-specific and personalized lexicon(s), attempting to match words and phrases in the query tagged as a grammatical object or object modifier with those identified in the database(s).

A word or combination of words may be tagged (i.e., labeled) according to their type/semantic meaning. Parsing may be performed using heuristic grammar rules, or an NER model may be constructed using techniques such as hidden Markov models, maximum entropy models, log linear models, conditional random fields (CRF), and the like. For example, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent may then be used to determine what database fields should be searched to determine the meaning of these phrases, such as searching a user's gazette for similarity with the framework slots. A first framework for "play music intent" may, for example, attempt to resolve the identified object based on the {Artist Name}, {Album Name}, and {Song name}, while a second framework for the same intent may attempt to resolve an object modifier based on the {Artist Name} and resolve the object itself based on the {Album Name} and a {Song Name} linked to the identified {Artist Name}. If the search of the gazetteer does not resolve the slot using gazetteer information, the NER component 262 may search the database of generic words associated with the domain (in the NLU storage 273). So for instance, if the query was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged query word or phrase and/or how closely the grammatical structure of the query corresponds to the applied grammatical framework, and may be based on whether the database indicates a relationship between an entry and information identified to fill other slots of the framework.

The NER component 262 may also use contextual operational rules to fill slots. For example, if a user had previously requested to pause a particular song and thereafter requested that the voice-controlled device to "please un-pause my music," the NER component 262 may apply an inference-based rule to fill a slot associated with the name of the song that the user currently wishes to play-namely the song that was playing at the time that the user requested to pause the music.

The results of NLU processing may be tagged to attribute meaning to the query. So, for example, "play mother's little helper by the rolling stones" may produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output of the NLU component 260 (which may include tagged text, commands, etc.) may then be sent to a command processor 290, which may be located on a same or separate system 120. A command processor 290 may be selected based on the NLU output. For example, if the NLU output includes a command to play music, the selected command processor 290 may be a music playing application, such as one located on device 110 or in a music playing appliance, configured to execute a music playing command. If the NLU output includes a search request, the selected command processor 290 may include a search engine processor, such as one located on a search server, configured to execute a search command.

FIG. 3A illustrates audio data 111 having a first portion 302—i.e., first audio data—and a second portion 304—i.e., second audio data. A beginpoint 306 marks the beginning of the first portion 302 of the audio data 111, and a first endpoint 308 marks the end of the first portion 302 of the audio data 111. The first endpoint 308 also marks the beginning of the second portion 304 of the audio data, and a second endpoint 310 marks the end of the second portion 304 of the audio data 111. As discussed above, the first portion 302 of the audio data 111 may represent a wakeword and may be used as reference audio data, and the second portion 304 of the audio data 111 may represent a request or command. In some embodiments, such as in a non-wakeword system or in an utterance that is part of an ongoing session with the system, the first portion 302 of the audio data 111 does not represent a wakeword; in other embodiments, the first portion 302 of the audio data 111 includes reference audio data taken from a previous recording of a desired speaker.

Figure 3B:
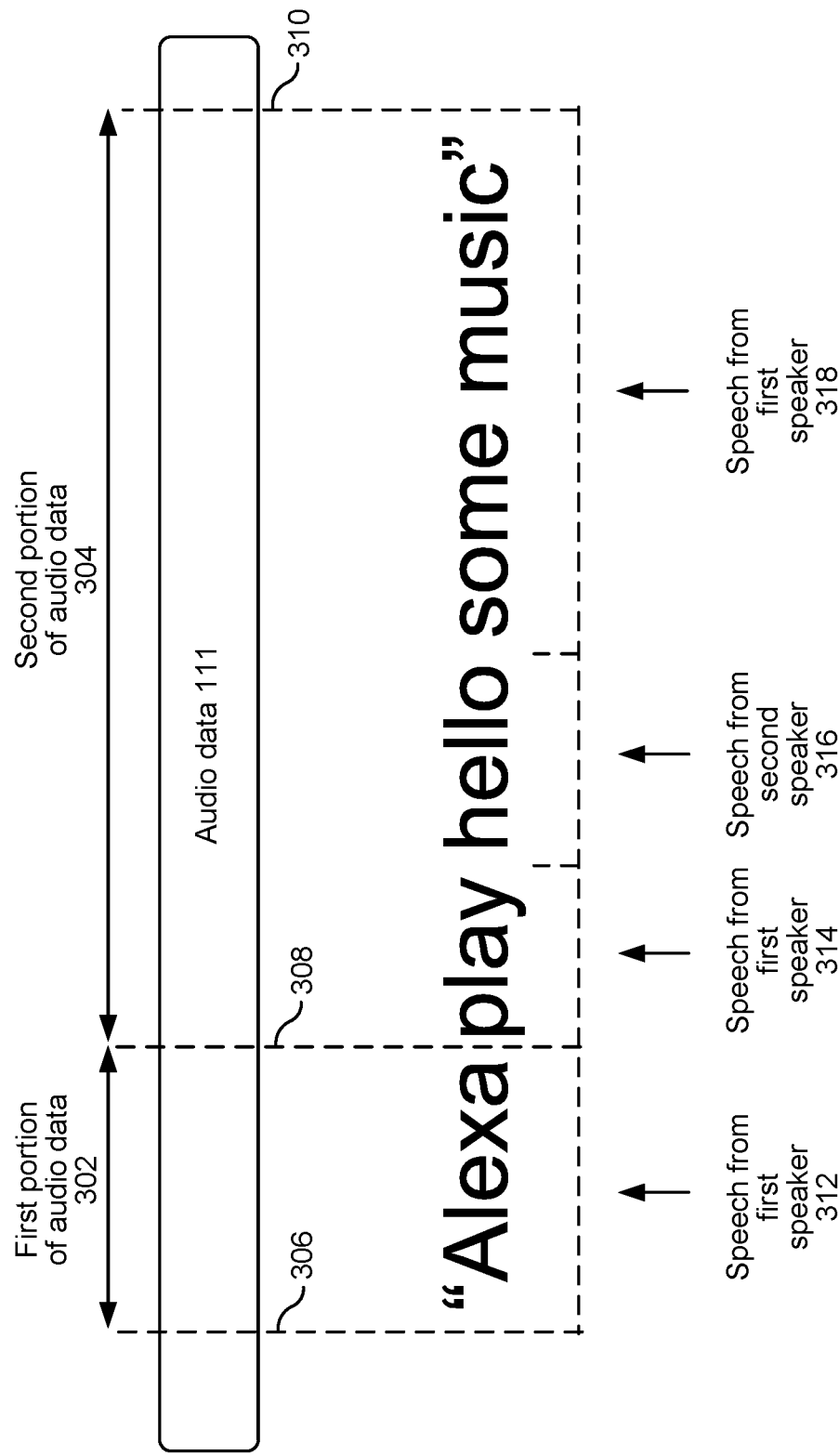

FIG. 3B illustrates that the audio data 111 may include representations of speech from a first speaker 10 and a second speaker 12. The first portion 302 of the audio data 111 may include a representation 312 of speech from the first speaker 10; this representation 312 may correspond to a wakeword, such as "Alexa," or may correspond to non-wakeword speech. As described herein, the first portion 302 of the audio data 111 may be processed to generate reference audio data include a feature vector corresponding to the representation 312 of speech from the first speaker 10. While many of the examples herein include using wakeword speech as representative speech, this is just an example, and other potential speech other than wakeword speech may also be used as representative speech and processed in the manner discussed below (for example, as discussed herein in reference to FIGS. 2-6C).

The second portion 304 of the audio data 111 may include representations of speech from both the first speaker 10, the second speaker 12, and/or other speakers and noise. For example, the speech of the first speaker 10 may be "play some music," while the speech of the second speaker 12 may be "hello." The speech of the second speaker 12 may occur during the speech of the first speaker such that the second portion 304 of the audio data 111 includes, during a first period of time, audio data corresponding to speech of the second speaker 12 and, during a second period of time different from the first period of time, audio data corresponding to speech of the first speaker 10. For example, FIG. 3B illustrates that a representation 316 of speech from the second speaker 12 occurs after a representation 314 of first speech from the first speaker 10 and before a representation 318 of second speech from the first speaker 10. As explained in greater detail below, the speech 316 of the second speaker 12 may be distinguished from the speech 314, 318 of the first speaker 10 by determining a similarity between the first portion 302 of the audio data 111 and the second portions 304 of the audio data 111.

Figure 3C:
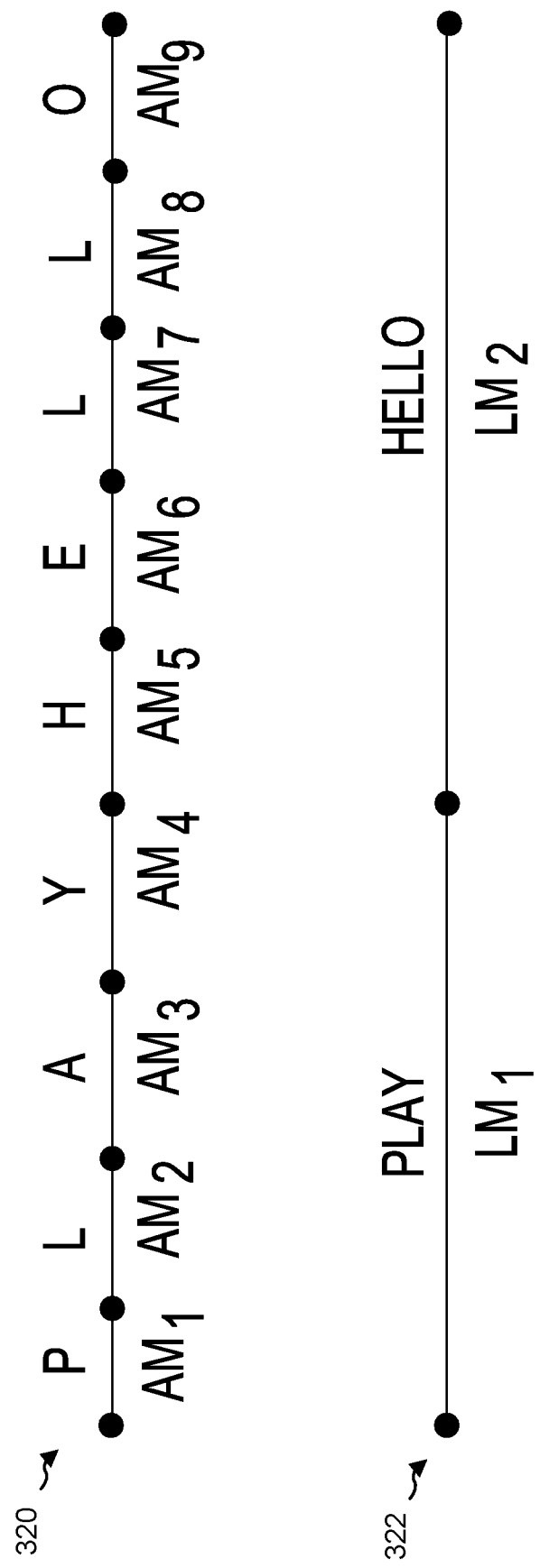
FIGS. 3C and 3D illustrate outputs of an acoustic model and a language model according to embodiments of the present disclosure.

FIG. 3C illustrates a relationship between acoustic modeling and language modeling. As illustrated, each processed phoneme included in the path 320 is associated with an acoustic model score $AM_1$ through $AM_9$ as may be determined, for example, by processing feature vectors from audio data by an acoustic model. The language model is then applied to associate each word in the path 322 with a language model score $LM_1$ or $LM_2$.

As part of the language modeling (or in other phases of the ASR processing), the speech recognition engine 258 may, to save computational resources, prune and discard low recognition score states or paths that have little likelihood of corresponding to the spoken utterance, either due to low recognition score pursuant to the language model, or for other reasons. Such pruned paths are considered inactive. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are considered active hypotheses.

Figure 3D:
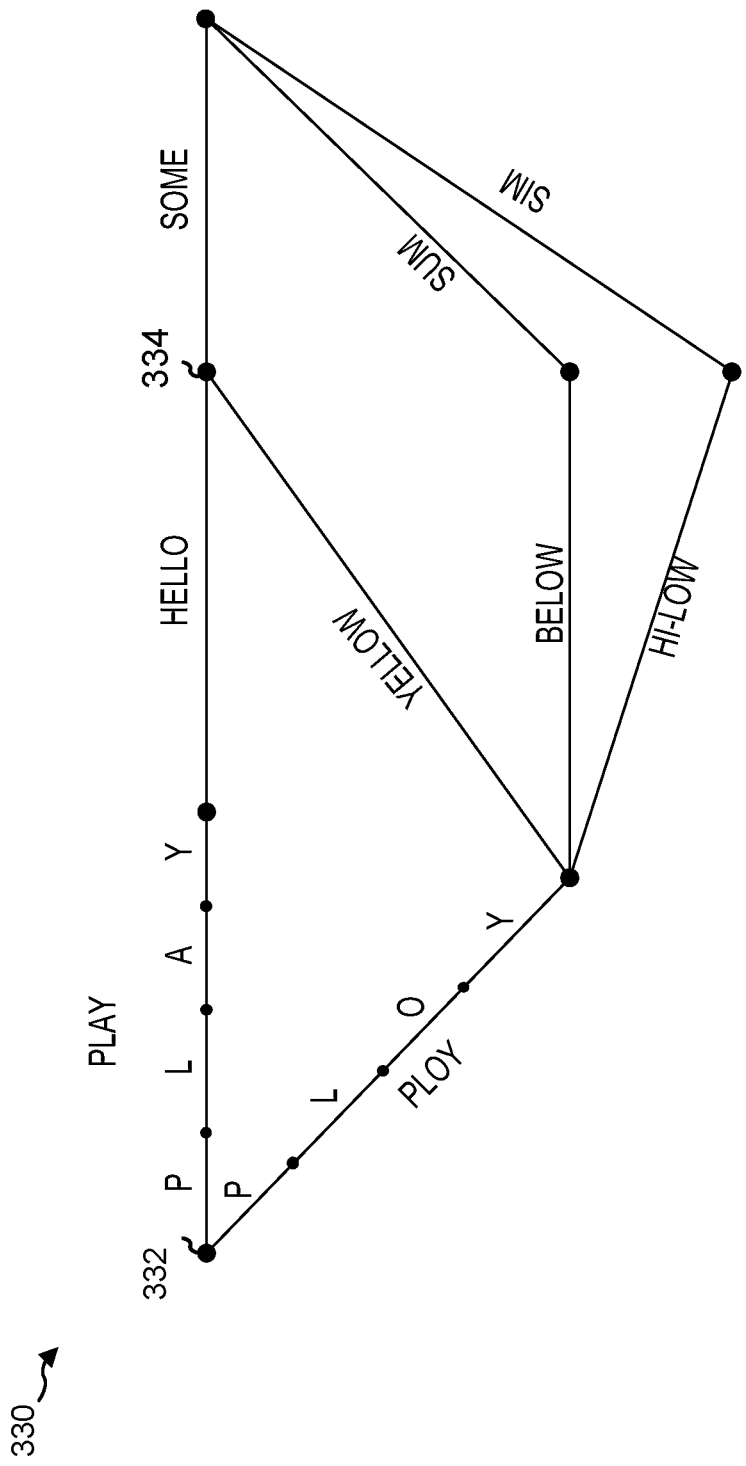

The speech recognition engine 258 may combine potential paths into a lattice representing speech recognition results. A sample lattice 330 is shown in FIG. 3D. The lattice 330 shows multiple potential paths of speech recognition results. Paths between large nodes represent potential words (for example "play", "ploy", etc.) and paths between smaller nodes represent potential phonemes (for example "P", "L", "A", "Y" and "P", "L", "O", "Y"). For purposes of illustration, individual phonemes are only shown for the first two words of the lattice. The two paths between node 332 and node 334 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated audio feature vectors Different arcs may also be associated with the same time data. For example, the arc "hello" may be associated with time data for a first group of audio frames that were processed by the speech recognition engine 258 to traverse the arc corresponding to "hello." The same time data may also be associated with the arc "yellow" as the same first group of audio frames were processed to traverse the arc "yellow" as the arc corresponding to "hello," that is the speech recognition engine 258 determined two potential words that may correspond to that first group of audio frames. The time data may be associated with those arcs for purposes of a matrix/vector representation of the lattice 330.

Figure 4A:
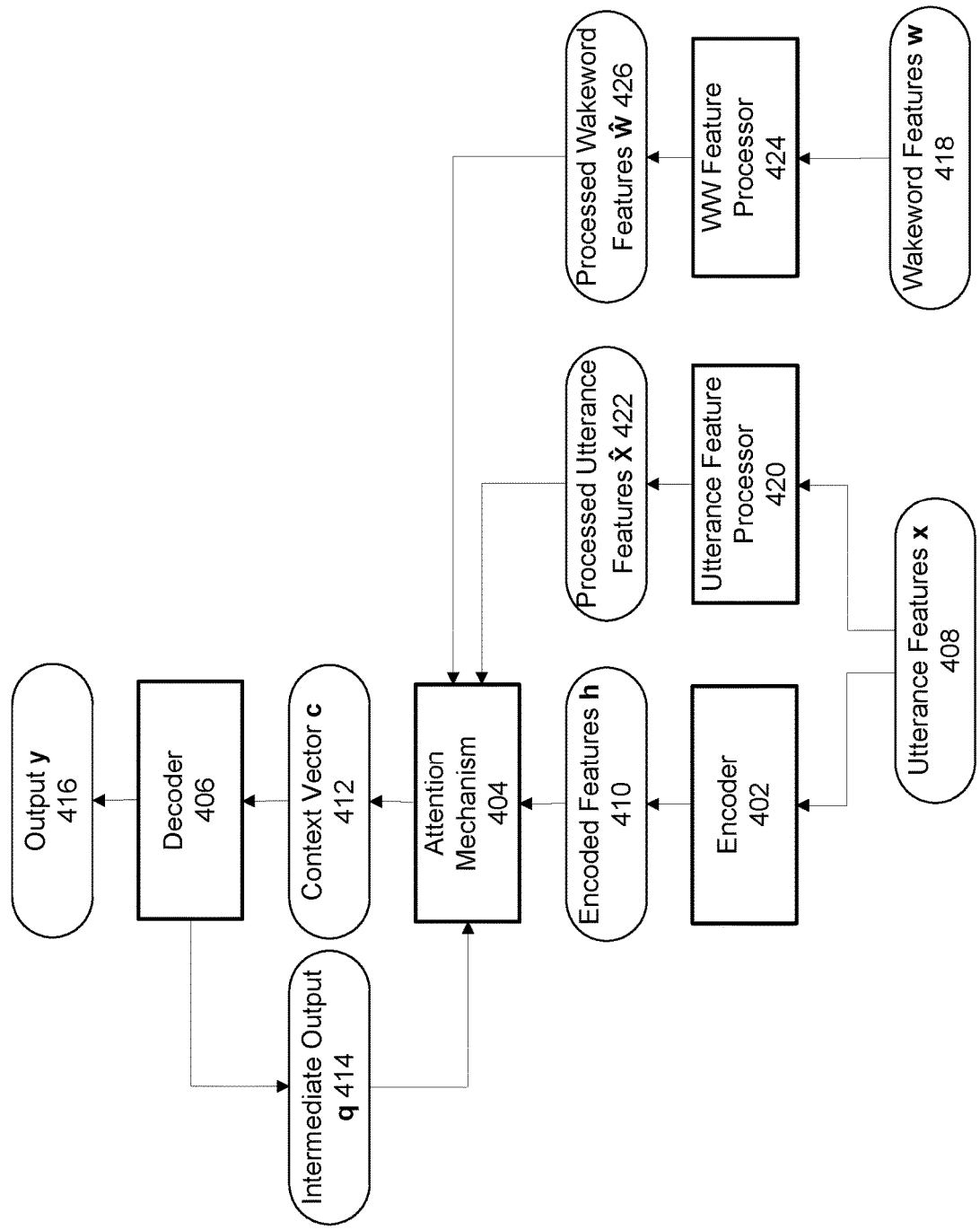
FIGS. 4A and 4B illustrate components of a system configured to perform speech recognition using utterance and wakeword features according to embodiments of the present disclosure.
Figure 4B:
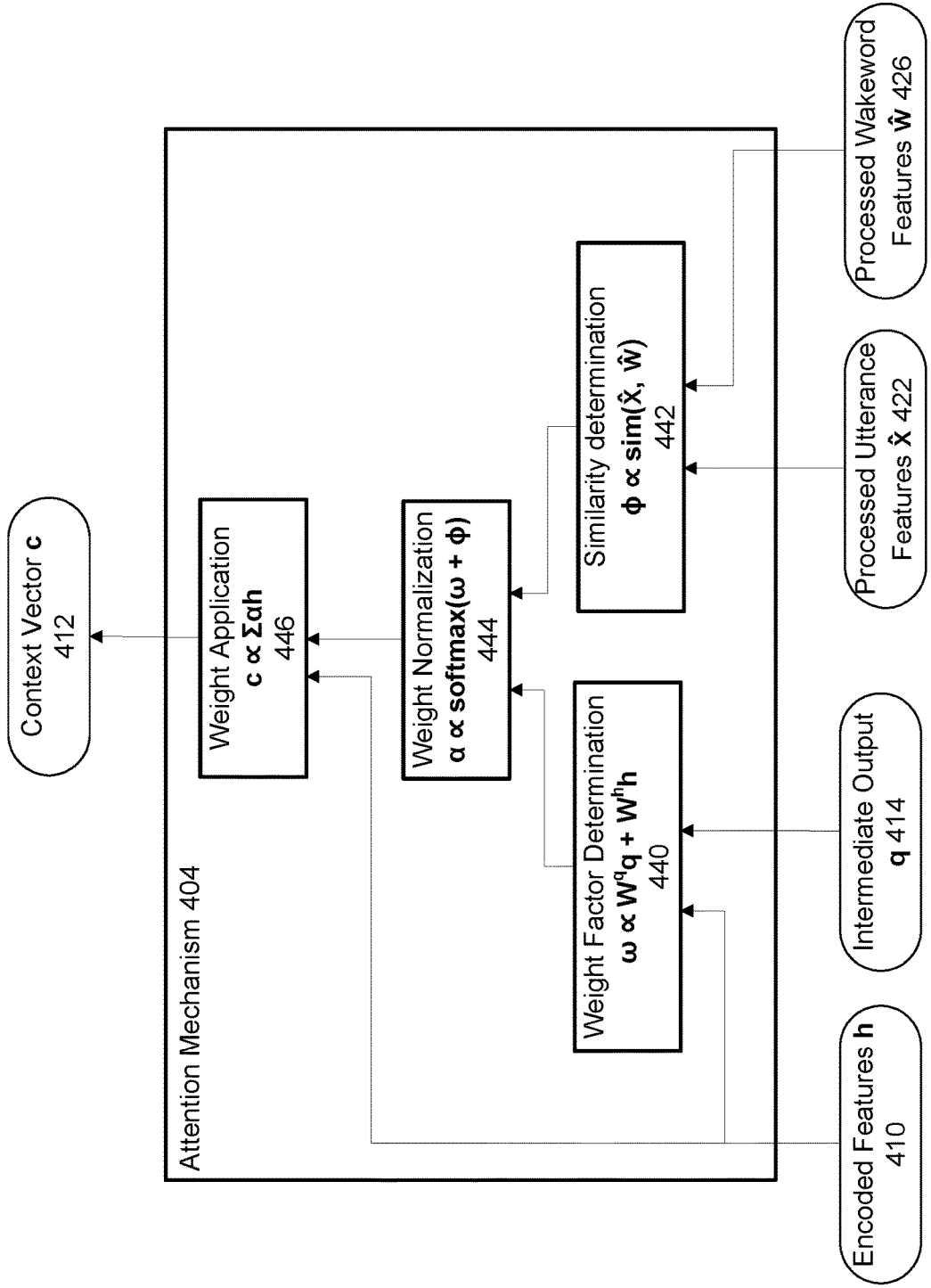

FIGS. 4A and 4B illustrate components of a system (e.g., system 120, ASR 250, etc.) for performing automatic speech recognition (ASR)—i.e., determining text data corresponding to audio data representing speech—in accordance with embodiments of the present disclosure. Referring first to FIG. 4A, the system includes an encoder 402, an attention mechanism 404, and a decoder 406. These components may be configured as a sequence-to-sequence ("seq2seq") system or an attention-based seq2seq system. Each of these components is described in greater detail below.

The encoder 402 receives utterance features x 408 and generates encoded features h 410 therefrom. The utterance features x 408 may be generated by the acoustic front end 256, as described above, and may include one or more features corresponding to frames of the audio data 111. The utterance features x 408 may be a feature vector of size L. The encoder 402 may include a neural network comprised of a number of units, such as long short-term memory (LSTM) units; the units may be arranged in layers. The encoder 402 may be trained using training audio data; an item of training data may be audio data that includes a representation of speech by a first speaker followed by representations of speech by the first speaker and at least one other speaker. In some embodiments, the audio training data includes indications of when the first speaker is speaking, such as a bit set to 1 for each frame of audio data that includes a representation of speech by the first speaker and set to 0 otherwise. Performance of the encoder 402 in processing the training data may be evaluated using, for example, a loss function that may be configured to arrive at a model for desired runtime operation; updated values for some or all of the neural-network units may be found using, for example, a gradient descent algorithm, and back-propagated to the neural-network units. The encoder 402 may be trained alone or with other components disclosed herein (i.e., end-to-end training). In some embodiments, the encoder 402 and/or other components described herein may be trained based at least in part on both the accuracy of the system for producing text that matches the training data and accuracy of the system in predicting the bits corresponding to speaker identity (i.e., multi-task learning).

An input layer may receive the utterance features x 408, and an output layer may generate the encoded features h 410; one or more hidden layers may be disposed between the input layer and the output layer. In some embodiments, a first layer receives the utterance features x 408 in a first direction (e.g., forward in time) and a second layer receives the utterance features x 408 in a second direction (e.g., backward in time); in these embodiments, the layers may be referred to as bi-directional layers. The output of the encoder 402—the encoded features h 410—may thus be found using the below equation (1).

$$h_{1:T} = \text{Encoder}(x_{1:L}) \qquad (1)$$

The encoder 402 may further include a convolution component for performing a convolution operation using the utterance features x 408 and for outputting the convolved utterance features to the one or more layers of units. The convolution component may determine, using the utterance features x 408, a weighted sum by applying one or more weights to features represented by the utterance features x 408 over a number of frames of audio data and by summing the result. The convolution component may operate on utterance features x 408 corresponding to consecutive frames of audio data or may operate on utterance features x 408 corresponding to non-consecutive frames of audio data (e.g., every second frame, every third frame, etc.). Such a convolution component may be referred to as a strided convolution component.

The encoded features h 410 may correspond to an internal representation of an idea or expression represented in the audio data 111; this internal representation may include a series of numbers, such as floating-point numbers. The encoded features h 410 may be a vector of dimension T; the dimension T of the encoded features h 410 may be equal to or less than the dimension L of the utterance features x 408. When T is less than L, the encoded features h 410 correspond to a downsampled representation of the encoded features h 410. The dimensions L and T of the utterance features x 408 and encoded features h 410 may vary in size; a longer word, sentence, or paragraph represented in the audio data 111 may correspond to larger dimensions L and T, while a shorter word, sentence, or paragraph may correspond to smaller dimensions L and T. The dimensions L and T may range, in some embodiments, from approximately 100-1000.

The attention mechanism 404 receives the encoded features h 410 and outputs a data vector c 412, which may represent context corresponding to an utterance, and which may also be referred to herein as a context vector, based thereon. The context vector c 412 may have a fixed dimension that is independent of the input audio 111 and/or the dimension of the encoded features h 410; this fixed dimension may be approximately 100-500. That is, the context vector c 412 may include data representing audio that is not necessarily within the audio frame corresponding to utterance features x 408, thus allowing the system to consider the "context" of the audio frame by considering some audio data that may surround the audio frame under consideration. The attention mechanism 404 may apply a number of weights α to elements of the encoded features h 410 to generate the context vector c 412. The weights may range from, for example, 0.0 to 1.0; weights close to 1.0 may be applied to features corresponding to speech of a first speaker 10, while weights close to 0.0 may be applied to features corresponding to speech of a second speaker 12. Weights $\alpha_{n,t}$ for given encoded features $h_t$ 410 at time t may thus be determined, using an intermediate output $q_n$ 414 of the decoder 406 (as explained in greater detail below) in accordance with the below equation (2).

$$\alpha_{n,t} = \text{Attention}(q_n, h_t) \qquad (2)$$

In some embodiments, the above equation (2) may be expressed as the below equation (3).

$$\alpha_{n,t} = \text{soft max}(v^T \tanh(W^q q_n + W^h h_t + b)) \qquad (3)$$

In the above equation, $v^T$ is a scaling factor, $W^q$ is a weight applied to the intermediate output q 514, $W^h$ is a weight applied to the encoded features h 410, and b is an offset factor. When $W^q$ is greater than $W^h$, the resulting weight factor $\alpha_{n,t}$ places greater emphasis on previously processed audio data 111 as represented by the intermediate output q 414; when $W^h$ is greater than $W^q$, the resulting weight factor $\alpha_{n,t}$ places greater emphasis on currently processed audio data 111 and less emphasis on the intermediate output q 414. The soft max operation normalizes the results such that every weight is between 0 and 1 and the sum of all the weights is 1. A weight that is adjusted to be within such a normalized scale may be referred to as a normalized weight factor. The context vector c 412 may be determined using the weights an, in accordance with the below equation (4).

$$c_n = \Sigma \alpha_{n,t} h_t \qquad (4)$$

The attention mechanism 404 may be trained using training audio data to determine the above-described values, such as $W^q$ and $W^h$. An item of training data may be audio data that includes a representation of speech by a first speaker followed by representations of speech by the first speaker and at least one other speaker. In some embodiments, the audio training data includes indications of when the first speaker is speaking, such as a bit set to 1 for each frame of audio data that includes a representation of speech by the first speaker and set to 0 otherwise. Performance of the attention mechanism 404 in processing the training data may be evaluated using, for example, a loss function; updated values for some or all of the neural-network units may be found using, for example, a gradient descent algorithm, and back-propagated to the neural-network units. The attention mechanism 404 may be trained alone or with other components disclosed herein (i.e., end-to-end training).

The decoder 406 generates an output y 416 and the intermediate output q 414 given the context vector c 412. Like the encoder 402, the decoder 406 may be a neural network, such as a recursive neural network, and may include neural-networks units, such as LSTM units, disposed in one or more layers. The decoder 406 may further include a soft max component for normalizing the output of the LSTM units such that the outputs lie between 0 and 1 and such that their sum adds up to 1. The intermediate output q 414 may be determined in accordance with the below equation (5).

$$q_n = \text{Decoder}(q_{n-1}, y_{n-1}, c_{n-1}) \quad (5)$$

In the above equation (5), $q_{n-1}$ represents an intermediate output q 414 from a previous frame, $y_{n-1}$ represents an output y 416 from a previous frame, and $c_{n-1}$ represents a context vector c 412 from a previous frame. The output y 416 of a current frame may be determined in accordance with the below equation (6).

$$y_n = \text{soft max}(q_n) \quad (6)$$

The decoder 406 may be trained using training audio data; an item of training data may be audio data that includes a representation of speech by a first speaker followed by representations of speech by the first speaker and at least one other speaker. In some embodiments, the audio training data includes indications of when the first speaker is speaking, such as a bit set to 1 for each frame of audio data that includes a representation of speech by the first speaker and set to 0 otherwise. Performance of the decoder 406 in processing the training data may be evaluated using, for example, a loss function; updated values for some or all of the neural-network units may be found using, for example, a gradient descent algorithm, and back-propagated to the neural-network units. The decoder 406 may be trained alone or with other components disclosed herein (i.e., end-to-end training).

As explained above, the audio data 111 may include a first portion 302 that includes a representation of speech of a first speaker 10 and a second portion 304 that includes representations of speech from both the first speaker 10 and a second speaker 12. As also explained above, a wakeword-confirmation component 259, which may reside with server(s) 120, may determine beginpoints and endpoints corresponding to the first portion 302 and the second portion 304; the acoustic front end 256 may generate reference audio data including wakeword features w 418 based at least in part on the first portion 302 and utterance features 408 based at least in part on the second portion 304. The utterance features 408 and the wakeword features 418 may each be feature vectors.

An utterance feature processor 420 may generate processed utterance features $\hat{x}$ 422 based at least in part on the utterance features 408. The dimension of the processed utterance features $\hat{x}$ 422 may vary based at least in part on the audio data 111. In various embodiments, the utterance feature processor 420 includes a neural network, such as an RNN having LSTM units in one or more layers, and encodes the utterance features 408 to generate the processed utterance features $\hat{x}$ 422. Similarly, a wakeword feature processor 424 may generate processed wakeword features $\hat{w}$ 426 based at least in part on the wakeword features w 418. In various embodiments, the wakeword feature processor 424 similarly includes a neural network, such as an RNN having LSTM units in one or more layers, and encodes the wakeword features w 4018. In some embodiments, the wakeword feature processor 424 further includes a downsampling function, such as a max-pooling function, to generate the processed wakeword features $\hat{w}$ 426 from encoded wakeword features. The max-pooling function may, for example, select only a subset of the encoded wakeword features corresponding to only a subset of frames of audio data 111. The wakeword feature processor 424 may perform this downsampling if includes a certain type of neural network, such as a convolutional network; if the wakeword feature processor 424 includes other types of neural networks, such as a recurrent network, the wakeword feature processor 424 may instead determine the processed wakeword features $\hat{w}$ 422 by selecting a state of the neural network corresponding to a last frame of the first portion 302 of the audio data 111. The dimension of the processed wakeword features $\hat{w}$ 426 may therefore be fixed and may be less than the dimension of the processed utterance features $\hat{x}$ 422.

Referring now to FIG. 4B, as described above, the attention mechanism 404 receives the encoded features h 410, intermediate output q 414, processed utterance features $\hat{x}$ 422, and processed wakeword features $\hat{w}$ 426 and generates the context vector c 412 based thereon. The attention mechanism 404 may be a neural network, such as an RNN, and may include a number of units, such as LSTM units, arraigned in one or more layers.

As explained above with reference to FIG. 4B, a weight-factor determination component 440 may determine weight data $\omega_{n,t}$ that include numbers proportionate to the sum of the encoded features h 410 and the intermediate output q 414, each of which may be weighted by weight factors $W^h$ and $W^q$, respectively. In accordance with the equation (3) above, the weight data $\omega_{n,t}$ may further be computed using a scaling factor $v^T$ and/or a constant value b. The weight-factor determination component 440 may be trained using training audio data to determine the above-described values, such as $W^q$ and $W^h$. An item of training data may be audio data that includes a representation of speech by a first speaker followed by representations of speech by the first speaker and at least one other speaker. In some embodiments, the audio training data includes indications of when the first speaker is speaking, such as a bit set to 1 for each frame of audio data that includes a representation of speech by the first speaker and set to 0 otherwise. Performance of the weight-factor determination component 440 in processing the training data may be evaluated using, for example, a loss function; updated values for some or all of the neural-network units may be found using, for example, a gradient descent algorithm, and back-propagated to the neural-network units. The weight-factor determination component 440 may be trained alone or with other components disclosed herein (i.e., end-to-end training).

The attention mechanism 404 may further include a similarity-determination component 442 that receives the processed utterance features $\hat{x}$ 422 and the processed wakeword features $\hat{w}$ 426 and generates similarity data $\phi$ based thereon. The processed wakeword features $\hat{w}$ 426 may be a single encoded feature vector that represents the entire first portion 302 of the audio data 111 that represents the wakeword (or other speech) of the first user 10; in other embodiments, the processed wakeword features $\hat{w}$ 426 may be two or more encoded feature vectors that represent different portions of the first portion 302 of the audio data 111. For example, a first feature vector may represent encoded features of a first half of the first portion 302, and a second feature vector may represent encoded features of a second half of the first portion 302. The processed wakeword features $\hat{w}$ 426 may include one or more vectors having a dimension of approximately 100-500.

The processed utterance features $\hat{x}$ 422 may similarly include one or more encoded feature vectors that represent the second portion 304 of the audio data 111; these vectors may similarly have a dimension of approximately 100-500. The similarity-determination component 442 may compare the one or more encoded vectors of the processed wakeword features $\hat{w}$ 426 to the one or more encoded vectors of the processed utterance features $\hat{x}$ 422 to determine the similarity data $\phi$. The similarity data $\phi$ may be one or more vectors of numbers that each indicate a degree of similarity between corresponding elements of the processed wakeword features $\hat{w}$ 426 and each element of the processed utterance features $\hat{x}$ 422. That is, a similarity value in the similarity data $\phi$ disposed at a first position in the vector may indicate a degree of similarity between a value of the processed wakeword features $\hat{w}$ 426 at that same position in the vector and a value of the processed utterance features $\hat{x}$ 422 also disposed at that same position. For example, if each vector has a dimension of 10, the value of the processed wakeword features $\hat{w}$ 426 at position 1 is compared to the value of the processed utterance features $\hat{x}$ 422 at position 1 determine the similarity value at position 1, the value of the processed wakeword features $\hat{w}$ 426 at position 2 is compared to the value of the processed utterance features $\hat{x}$ 422 at position 2 determine the similarity value at position 2, and so on up to position 10. The dimension of the similarity data $\phi$ may be the same as that of the processed wakeword features $\hat{w}$ 426 and/or the processed utterance features $\hat{x}$ 422 (or may be any other value). In some embodiments, a 0 value in the similarity data $\phi$ indicates no similarity between an element of the processed wakeword features $\hat{w}$ 426 and an element of the processed utterance features $\hat{x}$ 422, while a 1 value in the similarity data $\phi$ indicates perfect similarity between an element of the processed wakeword features $\hat{w}$ 426 and an element of the processed utterance features $\hat{x}$ 422. Values between 0 and 1 indicate varying degrees of partial similarity. The similarity-determination component 442 may thus determine the similarity data $\phi$ in accordance with the below equation (7).

$$\phi = \text{similarity}(\hat{x}, \hat{w}) \qquad (7)$$

The similarity-determination component 442 may compare the processed wakeword features $\hat{w}$ 426 to processed utterance features $\hat{x}$ 422 corresponding to each frame of the second portion 304 of the audio data and thereby generate similarity data $\phi$ for each frame of the audio data 111. In other embodiments, the similarity-determination component 442 compares the processed wakeword features $\hat{w}$ 426 to processed utterance features $\hat{x}$ 422 corresponding to groups of frames (e.g., 2-10 frames) of the second portion 304 of the audio data and thereby generate similarity data $\phi$ for groups of frames (e.g., 2-10 frames) of the audio data 111.

The similarity-determination component 442 may generate the similarity data $\phi$ in accordance with a geometric or mathematical function such as, for example, Manhattan distancing, Euclidian distancing, kernel functions, or cosine similarity.

A weight-normalization component 444 may combine the weight data $\omega$ with the similarity data $\phi$ by, for example, adding them together and may further normalize the result by performing a normalization function, such as a soft max function. One or of the weight data $\omega$ and the similarity data $\phi$ may be scaled prior to addition by a scaling factor g, in accordance with the below equation (8).

$$\alpha = \text{soft max}(\hat{w} + g \cdot \varsigma) \qquad (8)$$

A weight-application component 446 may then generate the context vector c 412 by applying the weight data $\alpha$ to the encoded features h 410 in accordance with the below equation (9).

$$c = \Sigma(\alpha \cdot h) \qquad (9)$$

In some embodiments, as described above with respect to the attention mechanism 404, the weight-factor determination component 440, similarity-determination component 442, weight-normalization component 444, and/or weight-application component 446 may be a trained model and may be trained together with the attention mechanism 404 using the training audio data. As described above, the training data may be audio data that includes a representation of speech by a first speaker followed by representations of speech by the first speaker and at least one other speaker. In these embodiments, the various components 440, 442, 444, 446 may not correspond to discrete parts of the attention mechanism 404; instead, the attention mechanism 404 may implement the functionality of the components 440, 442, 444, 446 in accordance with the above equations (7), (8), and (9).

Figure 5A:
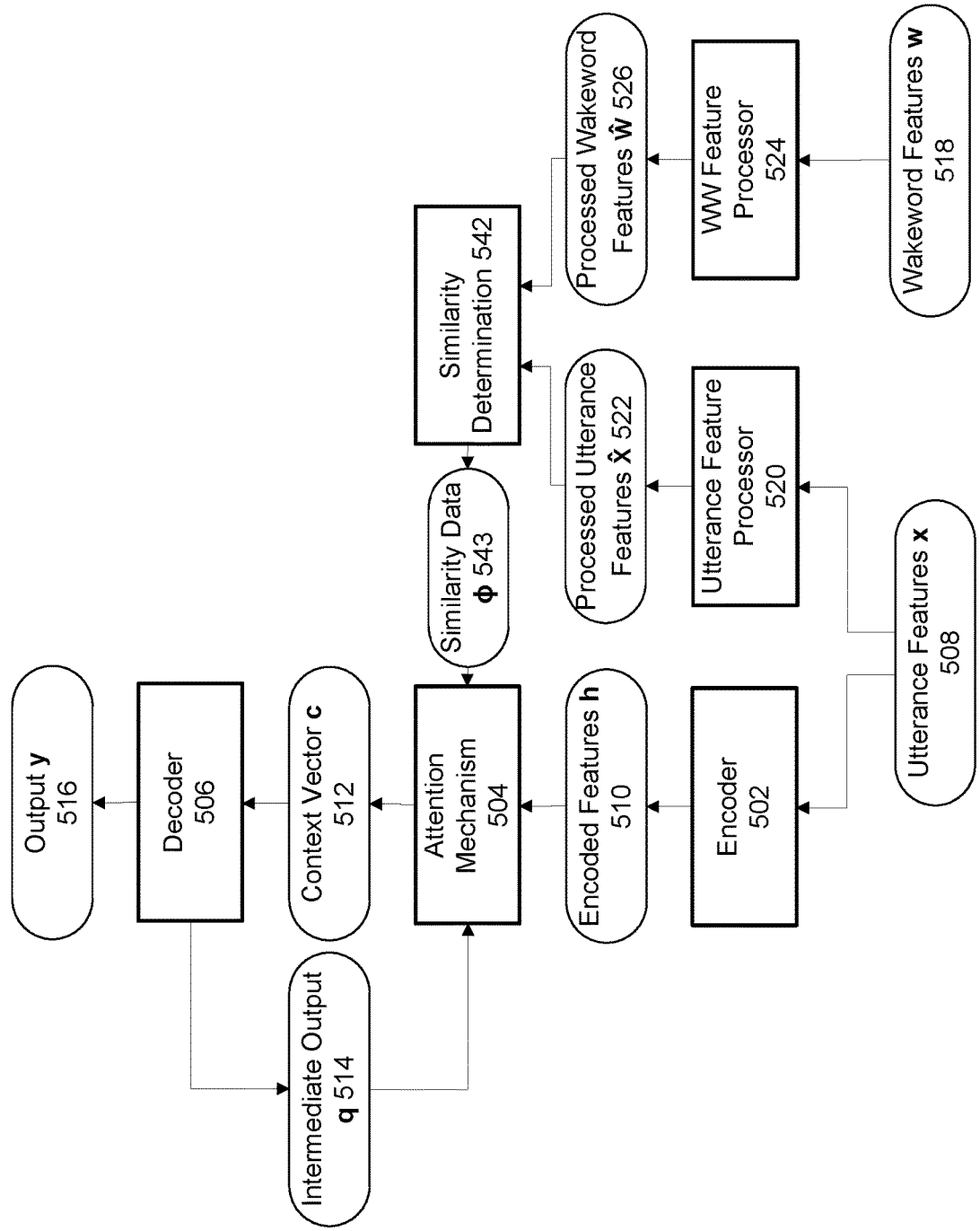
FIGS. 5A and 5B illustrate components of a system configured to perform speech recognition using utterance and wakeword features according to embodiments of the present disclosure.
Figure 5B:
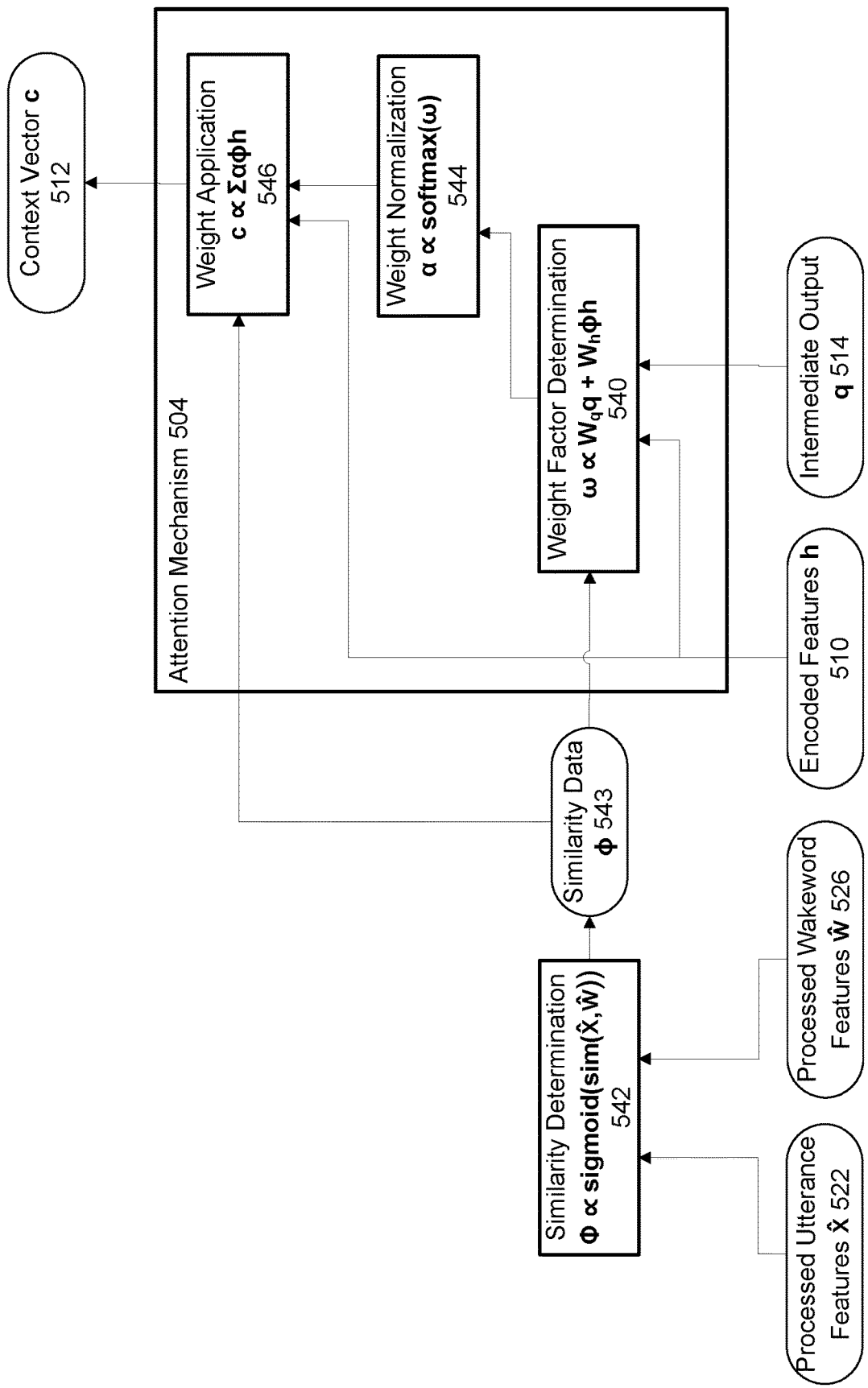

FIGS. 5A and 5B illustrate another embodiment of components for a system (e.g., system 120, ASR 250, etc.) for performing automatic speech recognition. Like the system described with reference to FIGS. 4A and 4B, the system of FIG. 5A includes an encoder 502, an attention mechanism 504, a decoder 506, an utterance feature processor 520, a wakeword feature processor 524, and a similarity determination component 542. The encoder 502 receives utterance features 508 and generates encoded features h 510. The utterance feature processor 520 also receives the utterance features 508 and generates processed utterance features x 522; the wakeword feature processor 524 receives the wakeword features 518 and generates processed wakeword features $\hat{w}$ 526. The similarity determination component 542 receives the processed utterance features $\hat{x}$ 522 and the processed wakeword features $\hat{w}$ 526 and generates similarity data 543. The attention mechanism 504 receives the encoded features h 510, the similarity data $\phi$ 543, and intermediate data q 514 of the decoder 506 to generate a context vector c 512. The decoder 506 receives the context vector c 512 and generates the output data y 516 and the intermediate data q 514. The components illustrated in FIG. 5A correspond to similar components in FIG. 4A and may be similarly constructed and configured, as described above. The particular weights and other settings corresponding to neural-network units of the system of FIG. 5A may, however, have different values than those of the system of FIG. 4A.

FIG. 5B illustrates the attention mechanism 504 of FIG. 5A. Like the attention mechanism 404 of FIG. 4A, the attention mechanism 504 includes a weight-factor determination component 540 for determining weight data w given encoded features h 510, intermediate output q 514, and similarity data φ 543, a weight-normalization component 544 for normalizing the weight data ω, and a weight-application component 546 for applying the normalized weight factors α to the encoded features h 510. The components illustrated in FIG. 5B may correspond to similar components in FIG. 4B and may be similarly constructed and configured, as described above. The particular weights and other settings corresponding to neural-network units of the system of FIG. 5B may, however, have different values than those of the system of FIG. 4B.

The similarity determination component 542 determines the similarity data φ in accordance with the below equation (10).

$$\varphi = \text{sigmoid}(g \cdot \text{similarity}(\hat{x}, \hat{w})) \quad (10)$$

The sigmoid function may thus be used to generate a vector of values that lie on a sigmoid curve. The majority of values may be disposed either at or near a maximum value of the curve or at or near a minimum value of the curve; fewer values may be disposed at midpoints on the curve. The sigmoid curve may thus correspond to mask data—a "mask" of yes-or-no values. Thus if a value is at or near the maximum value of the curve, the corresponding similarity is passed through unchanged, while if a value is at or near the minimum value of the curve, the corresponding similarity is zeroed out. The mask data may be used, in accordance with the below components, to include or exclude audio features, audio frames, or other audio data from the context vector c 512; if an element of the mask data corresponds to "yes," "1," or a similar positive value, the corresponding feature or frame data is included, and if an element of the mask data corresponds to "no," "0," or a similar negative value, the corresponding feature or frame data is excluded.

The weight-factor determination component 540 may determine the weight data ω in accordance with the below equation (11).

$$\omega = v^T \tanh(W^q q_n + W^h h_i \varphi + b) \quad (11)$$

In the above equation (11), unlike the system of FIG. 4B, the mask data φ is applied to the encoded features h 510. The weight-normalization component 544 may determine the normalized weight factors α in accordance with the below equation (12).

$$\alpha = \text{softm}(\hat{w}) \quad (12)$$

The weight-application component 546 may determine the context vector c 512 in accordance with the below equation (13).

$$c = \Sigma(\alpha \cdot \varphi \cdot h) \quad (13)$$

In the above equation (113, unlike the system of FIG. 4B, the mask data φ is applied to the encoded features h 510 to thereby include or exclude elements of the encoded features h 510.

In some embodiments, like the attention mechanism 404 of FIG. 4B, the similarity determination component 542, weight-factor determination component 540, weight-normalization component 544, and/or weight-application component 546 may be a trained model and may be trained together with the attention mechanism 504 using the training audio data. As described above, the training data may be audio data that includes a representation of speech by a first speaker followed by representations of speech by the first speaker and at least one other speaker. In these embodiments, the various components 540, 542, 544, 546 may not correspond to discrete parts of the attention mechanism 504; instead, the attention mechanism 504 may implement the functionality of the components 540, 542, 544, 546 in accordance with the above equations (10), (11), (12), and (13).

Figure 6A:
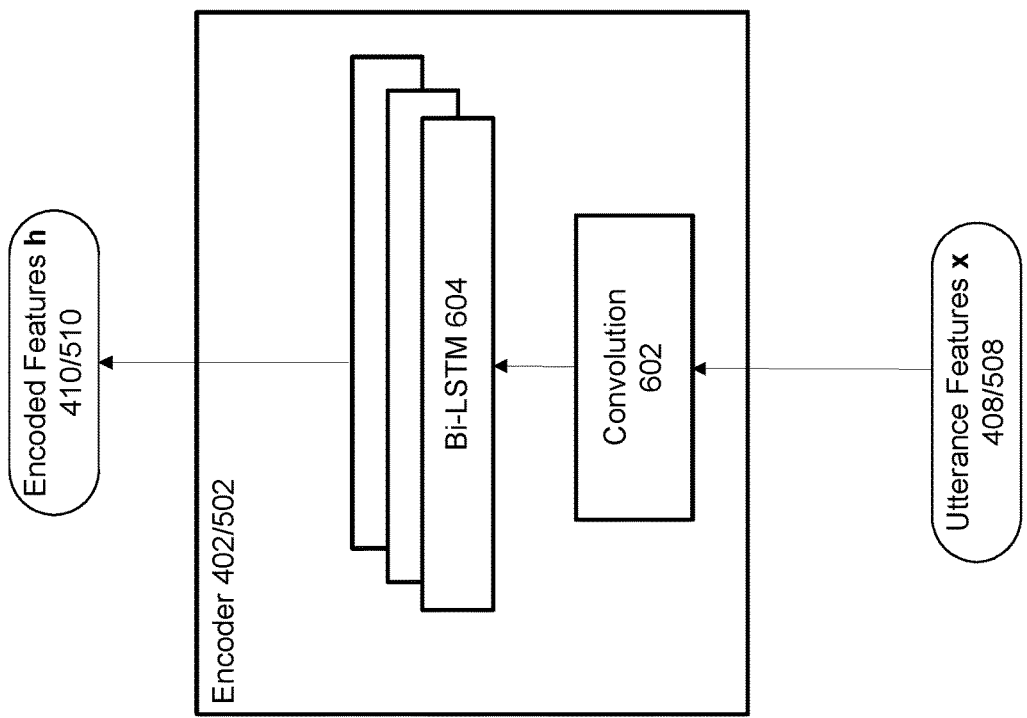
FIGS. 6A and 6B illustrate system components configured to encode and decode data according to embodiments of the present disclosure.
Figure 6B:
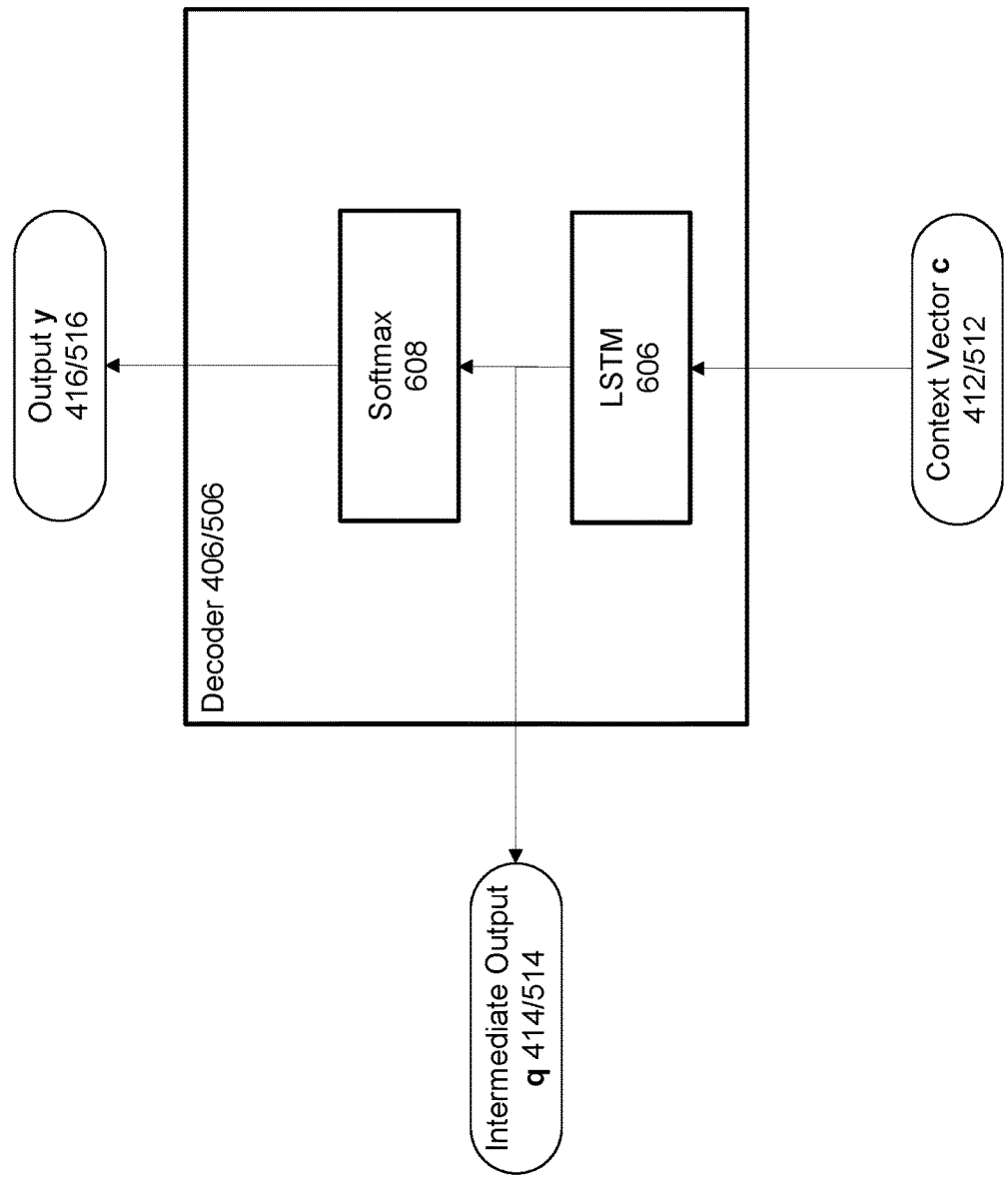

FIGS. 6A, 6B, and 6C illustrate embodiments of the encoder 402/502, decoder 406/506, and wakeword-confirmation component 259 discussed above. In FIG. 6A, the encoder 402/502 includes a convolution component 602, which may perform a strided convolution. The encoder 402/502 further includes a bi-directional LSTM 604 which may include, for example, three layers. The encoder 402/502 receives the utterance features x 408/508, performs a convolution using the convolution component 602, and then processes the result with the LSTM 604 to generate the encoded features h 410/510.

The utterance features x 408/508 may include one or more audio feature vectors corresponding to one or more frames of audio data. For example, a first audio feature vector of the utterance features x 408/508 may correspond to a beginning of an utterance, and a last audio feature vector of the utterance features x 408/508 may correspond to an end of the utterance. The encoded features h 410/510 may represent a plurality of audio feature vectors corresponding to a plurality of audio frames and may correspond to higher-level features of the audio data, such as intent, tone, and pitch. The bi-directional LSTM 604 may process the utterance features x 408/508 in both a first order (e.g., starting with the first audio feature vector and proceeding to the last audio feature vector) and in a reverse order (e.g., starting with the last audio feature vector and proceeding to the first audio feature vector). The encoder 402/502 is not, however, limited to only bi-directional LSTMs, and in some embodiments includes a uni-directional LSTM or other uni-directional component, such as a gated recurrent unit (GRU). The encoder 402/502 may further include log-filterbank energy (LFBE) features that are normalized by applying conventional recursive log-amplitude mean subtraction (LAMS).

As noted above, the audio data may include a sequence of audio frames where each frame is made of a sequence of features derived from audio data. Typical features include log filterbank energies (LFBE), mel-frequency cepstral coefficients (MFCCs), perceptual linear prediction (PLP), or any other meaningful features that can be derived from the audio data including the digitalized audio signal itself.

FIG. 6B illustrates an embodiment of the decoder 406/506 described above with reference to FIGS. 4A and 5A. The decoder 406/506 receives the context vector c 412/512 and processes it with an LSTM 606 to generate intermediate data q 414/514 which may, as described above, be used by the attention mechanism 404/504. Like the encoder 402/502, however, the decoder 406/506 is not limited to only an LSTM, and other types of neural networks, such as GRUs, may be included in the decoder 406/506. The intermediate data q 414/514 may represent prior output data y 516 from one or more prior interactions with the user 10. The decoder 406/506 may include a soft max component 608 that performs a soft max operation on the intermediate data q 414/514 to generate the output y 416/516.

FIG. 6C illustrates an embodiment of the wakeword confirmation component 259, which may identify a wakeword in the input audio data 111 using wakeword/keyword detection techniques, such as those described above. The wakeword confirmation component 259 may then output a confirmation 612 that the wakeword is detected or not detected in the input audio data 111. If the wakeword is detected, the input audio data 111 may be passed to a downstream component (such as the acoustic front end 256 and/or the speech recognition engine 258) for further processing. The wakeword confirmation component 259 may also determine timestamps corresponding to the wakeword start time 614 and wakeword end time 616 in the input audio data 111. The timestamps 614 and 616 may be indicators of start/end frames or audio feature vectors corresponding to the wakeword or other indicators of start/end time for the wakeword. Thus, the timestamps 614 and 616 may be used to demarcate the wakeword portion in the input audio data 111.

The wakeword portion of the audio data may correspond to a first portion of the audio data. The start timestamp may indicate the start of the wakeword and the end timestamp may indicate the end of the wakeword. Thus the first portion of audio data may start at the start location and end at the end location and may include a first plurality of audio feature vectors in between. The input audio data 111 may include some audio data that occurs prior to the wakeword; this audio data may be processed or may be ignored as part of the speech processing. The audio data 111 may be divided into at least two portions, the first portion that includes the wakeword and the second portion that includes further audio data. The non-wakeword portion of the input audio data 111 may be referred to as the payload, which may be the focus of downstream speech processing. The payload may include the second portion, a third portion, fourth portion, etc. The individual portions may be comprised of audio feature vectors. The audio feature vectors making up the first portion (i.e., the feature vectors that correspond to the wakeword) may be selected as the reference audio data.

In a second example, a wakeword does not begin a particular incoming audio data signal, such as in a non-wakeword system or in an utterance that is part of an ongoing session with the system 120 in which the wakeword is not necessary. In such a situation, the speech recognition component 258 may first make a first pass at recognizing words in input audio. The system 120 may determine that some first portion of that input audio corresponds to the desired speaker such as the first word, the first two words, the first three words, etc. This portion of the input audio may be determined to be the reference audio data and the frames corresponding to the early portion may be the reference audio data. That reference audio data may then be used as detailed below for further processing, such as speech detection, a second pass at ASR, or the like. Thus, the first portion of the audio data 111 may still be used as the reference audio data even if it does not include the wakeword.

In a third example, reference audio data may be taken from a previous recording from the desired speaker, for example a recording taken during a voice training session. For example, during a configuration session the system 120 may send prompt audio data to the local device 110. The prompt audio data may include, for example, audio data corresponding to a prompt to a user 10 to "Please speak a sample sentence." The device 110 may output audio corresponding to the prompt. The user 10 may then speak a sample sentence such as "hello, my name is Jo." The audio 10 corresponding to the sample sentence may be captured by the device 110 and converted into audio data, which the device 110 sends to the system 120. The audio data may then be stored in a user profile storage associated with user 10. For further commands coming from a device associated with user 10 (such as another device 110 associated with the user profile of the user 10), the audio data may be used as the reference audio data.

In a fourth example, the system may make an assumption that the speaker who spoke a previous sentence to the system (for example, the previous utterance received by a particular input device) is the desired speaker. Thus, a portion of the input audio data from the previous sentence may be used as the reference audio data. For example, at runtime, the device 110 may capture audio corresponding to a first utterance, such as "Alexa, set a timer." The device 110 may send first audio data corresponding to the first utterance to the system 120 for speech processing. The system 120 may perform speech processing on the first audio data and may determine that further information is needed to execute a command. The system may then determine and send prompt audio data to be output by device 110, such as "for how long?" The device 110 may then capture second audio corresponding to a second utterance, such as "five minutes." The device 110 may send second audio data corresponding to the second utterance to the system 120 for speech processing. The server 120 may know that the second audio data is part of a same session or exchange as the first audio data and may use the first audio data as the reference audio data.

Referring to FIGS. 7A, 7B, and 7C, additional speech-processing components may process the output of the encoder, attention mechanism, and/or decoder depending on system configuration and the types of data output by an encoder, attention mechanism, and/or decoder. Referring first to FIG. 7A, an attention mechanism 700a, which may be an example of the attention mechanism 406/506 described above, may generate feature vector data 703a, which may include some or all of the encoded features h 410/510, context vector c 412/512, and/or internal state information of an encoder 701a. The feature vector data 703a may correspond to encoded features of the utterance features x 408/508, which correspond to one or more frames of audio data and may represent higher-level features of the audio data, such as tone, pitch, frequency, or intent.

The acoustic model 706 (which may be a model 253 stored with ASR model storage 252) may be a neural network used to determine a likelihood that a certain detected sound corresponds to a particular unit of input data. Each node of the acoustic model 706 input layer may represent an acoustic feature of feature vector data 704a, and each node of the acoustic model 706 output layer may represent a score corresponding to an acoustic unit (such as a phoneme, triphone, etc.) and/or associated states that may correspond to the sound represented by the audio feature vector. For a given input to the acoustic model 706, it may output a number of potential outputs each with an assigned score representing a probability that the particular output is the correct output given the particular input. The top scoring output of the acoustic model 706 may then be fed into an HMM which may determine transitions between sounds prior to passing the results to a grammar/language model 708b.

The grammar/language model 708b (which may also be a model 253 stored with ASR model storage 252) may be a neural network that indicates how likely a word matches one or more acoustic units output by the acoustic model 706 (e.g., determining grammar) and/or how likely certain words are used together (e.g., determining language), as based on training data including many different example sentences and text available to the system. The grammar/language model 708b may encode a representation of how likely such words or word combinations are to be used by a speaker, thus assisting an ASR system in determining the likelihood that a certain word was spoken during an utterance that is being processed.

Figure 9:
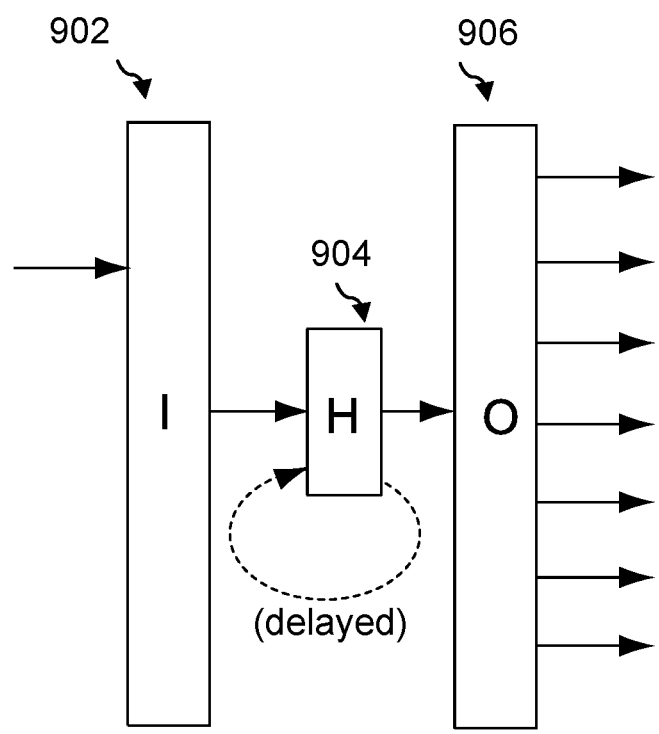
FIG. 9 illustrates a neural network for speech recognition according to embodiments of the present disclosure.

Each node of the grammar/language mode 708*b* input layer may represent a previous word and each node of the grammar/language mode 708*b* output layer may represent a potential next word as determined by the trained grammar/language mode 708*b*. Because the grammar/language mode 708*b* may be configured as a recurrent neural network which incorporates some history of words processed by the grammar/language mode 708*b*, such as the network illustrated in FIG. 9, the prediction of the potential next word may be based on previous words in an utterance and not just on the most recent word. The grammar/language mode 708*b* may also output weighted predictions for the next word.

The NLU component 260 receives the output of the grammar/language mode 708*b*, which may be an ASR hypothesis (e.g., text data) corresponding to a likelihood that the text data that corresponds to an utterance represented by the audio data 111. The NLU component 260 makes a semantic interpretation of the phrase(s) or statement(s) represented by the output. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110 and/or the system 120) to execute the intent. For example, if the text data corresponds to "play music," the NLU component 260 may determine an intent that the system 120 output music. For further example, if the text data corresponds to "what is the weather," the NLU component 260 may determine an intent that the system 120 output weather information associated with a geographic location of the device 110. In another example, if the text data corresponds to "turn off the lights," the NLU component 260 may determine an intent that the system 120 turn off lights associated with the device 110 or the user 10.

Software running on the system 120 may enable the system 120 to execute specific functionality in order to provide data or produce some other requested output. The system 120 may be configured with more than one piece of software. For example, weather service software may enable the system 120 to provide weather information, car service software may enable the system 120 to book a trip with respect to a taxi or ride sharing service, restaurant software may enable the system 120 to order a pizza with respect to the restaurant's online ordering system, etc. The software may operate in conjunction between the system 120 and other devices, such as the device 110, in order to complete certain functions. Inputs to the software may come from speech processing interactions or through other interactions or input sources.

Referring to FIG. 7B, in other embodiments, the decoder 704*b* may be configured to output acoustic unit data 704*b* (similarly to how the acoustic model 706 outputs acoustic unit data, as described above), which is in turn used by a grammar/language model 708*b* to determine how likely a word matches one or more acoustic units in the acoustic unit data 704*b* (e.g., determining grammar) and/or how likely certain words are used together (e.g., determining language). The NLU component 260, as described above, may then make a semantic interpretation of the phrase(s) or statement(s) represented by the output and carry out one or more actions based thereon.

Referring to FIG. 7C, in some embodiments, the decoder 704*c* may be configured to output text data 704 (e.g., words), which may be text data corresponding to an utterance represented in the audio data 111 and/or candidate text data corresponding to a likelihood that the text data corresponds to an utterance represented in the audio data 111 (e.g., a hypothesis). In these embodiments, a language model 708*c* determines output text data based on the hypothesis based at least in part on how likely certain words are used together, as described above. The NLU component 260, as described above, may then make a semantic interpretation of the phrase(s) or statement(s) represented by the output and carry out one or more actions based thereon.

The encoder 402, attention mechanism 404, decoder 406, utterance feature processor 420, and/or wakeword feature processor 424 may be one or more neural-network models. An example neural network for ASR is illustrated in FIG. 7. Each of the encoder 402, attention mechanism 404, decoder 406, utterance feature processor 420, and/or wakeword feature processor 424 may be structured with an input layer 702, an optional middle layer 704, and an output layer 706. The middle layer 704 may also be known as the hidden layer. Each node of the hidden layer 704 may be connected to each node in the input layer and each node in the output layer. Although illustrated in FIG. 8 with a single hidden layer, the encoder 402, attention mechanism 404, decoder 406, utterance feature processor 420, and/or wakeword feature processor 424 may include multiple middle layers. In this case, each node in a hidden layer may connect to each node in the next higher layer and next lower layer. Each node of the input layer corresponds to an input to the neural network, such as the utterance features 408 and/or wakeword features 418, and each node of the output layer represents a potential output of the neural network, such as output data 416. Each connection from one node to another node in the next layer may be associated with a weight or score. The neural network may output a single hypothesis or a weighted set of possible hypotheses.

Figure 8:
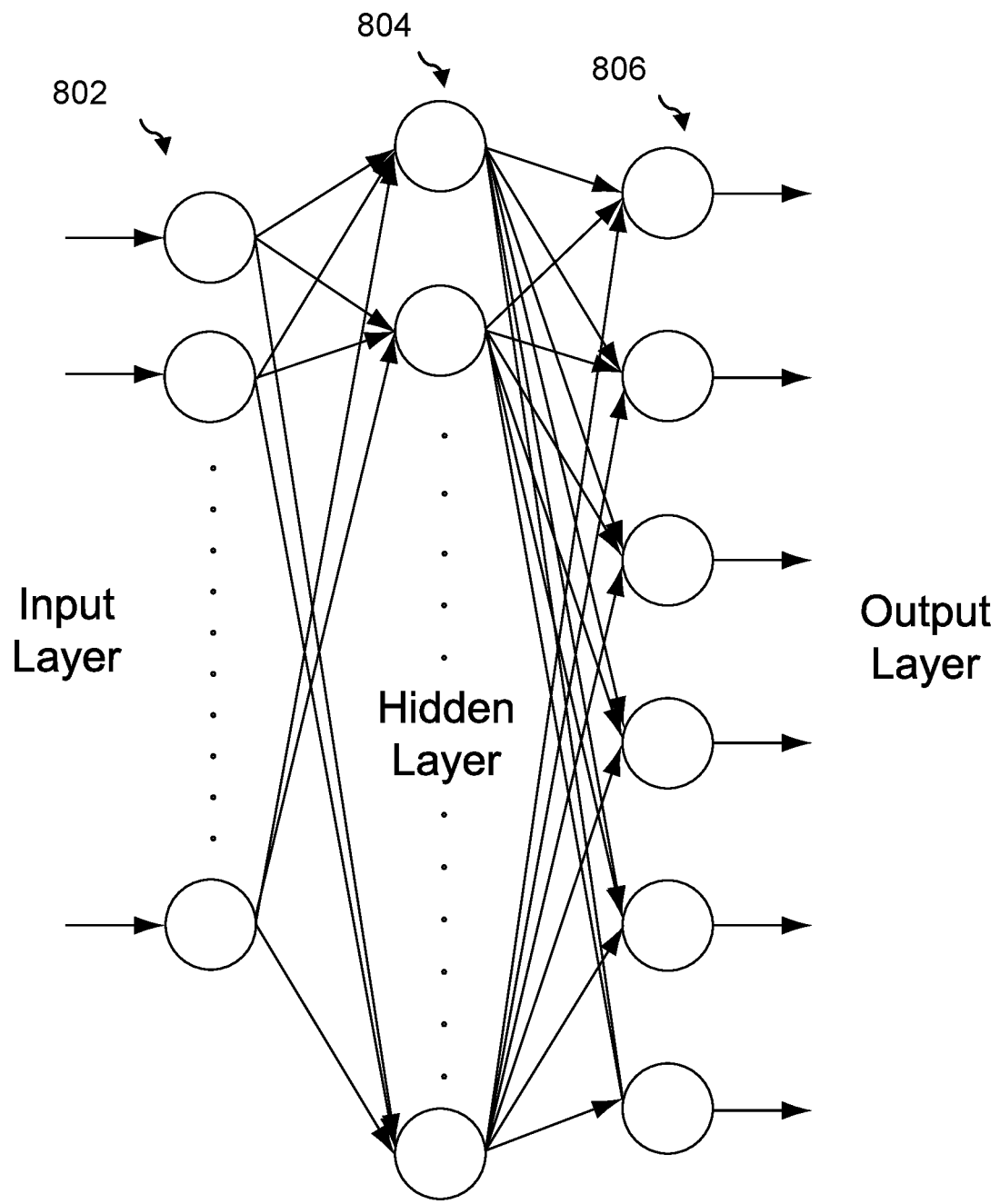
FIG. 8 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 8. Each node of the input layer 802 connects to each node of the hidden layer 804. Each node of the hidden layer 804 connects to each node of the output layer 806. As illustrated, the output of the hidden layer 804 is fed back into the hidden layer for processing of the next set of inputs. A neural network incorporating recurrent connections may be referred to as a recurrent neural network (RNN); one type of RNN is the long short-term memory network 604 illustrated in FIG. 6A.

In the case where a speech processing system uses one or more neural networks, each node of the neural network input layer may represent an acoustic feature of an audio feature vector of acoustic features, such as the utterance features 408 and/or wakeword features 418, and each node of the output layer may represent a score corresponding to text data, acoustic unit data (such as a phoneme, triphone, etc.), and/or associated states that may correspond to the sound represented by the audio feature vector. For a given input to the neural network, it outputs a number of potential outputs each with an assigned score representing a probability that the particular output is the correct output given the particular input. Each node of the output layer may represent a potential next word as determined by the neural network model. A recurrent neural network may incorporate some history of words processed by the neural network, such as the intermediate output 414 of the decoder 406; the prediction of the potential next word may be based on previous words in an utterance and not just on the most recent word. The neural network may also output weighted predictions for the next word.

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech recognition when the entire lattice is processed.

Figure 10:
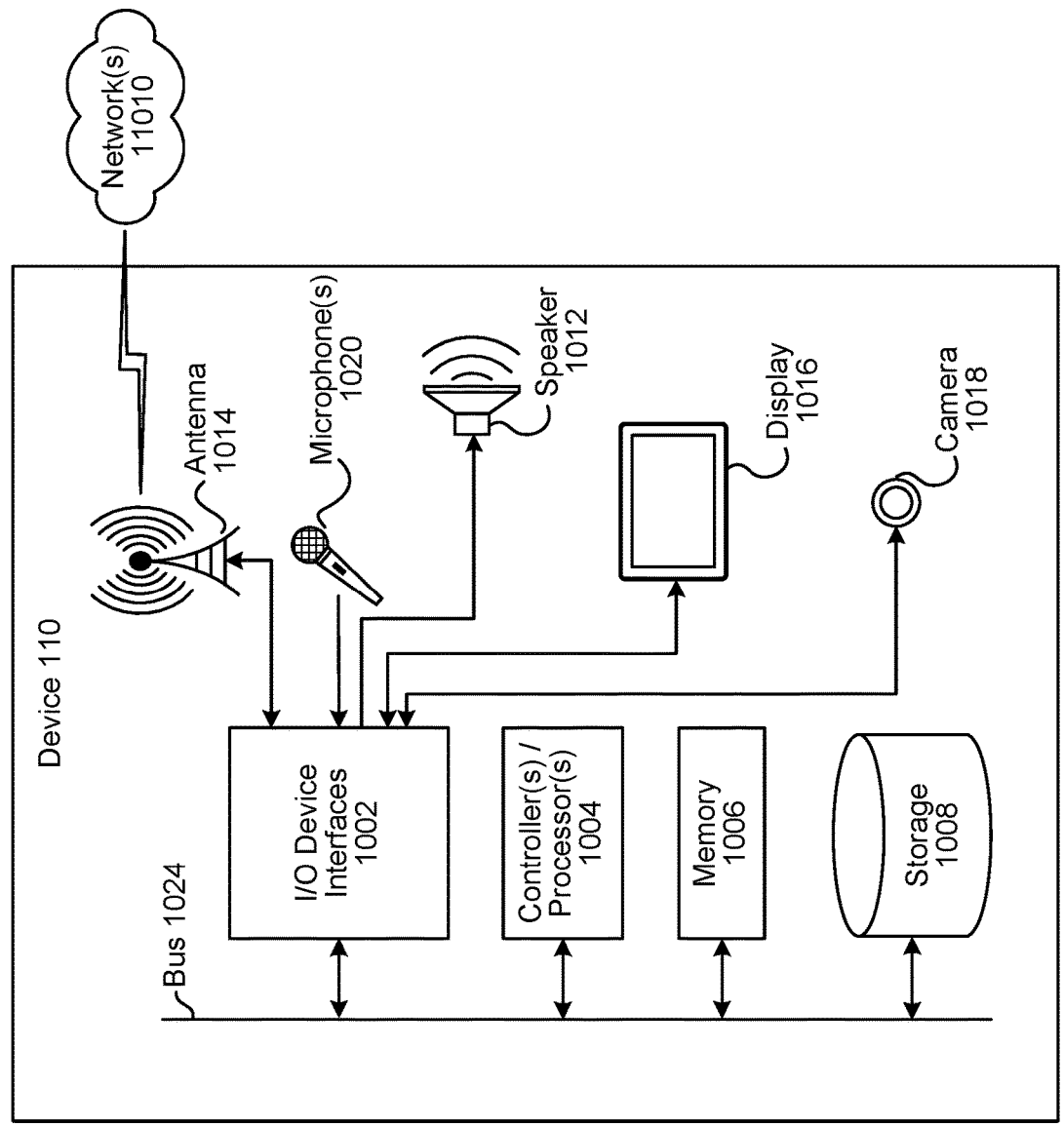
FIG. 10 is a block diagram illustrating example components of a device according to embodiments of the present disclosure.
Figure 11:
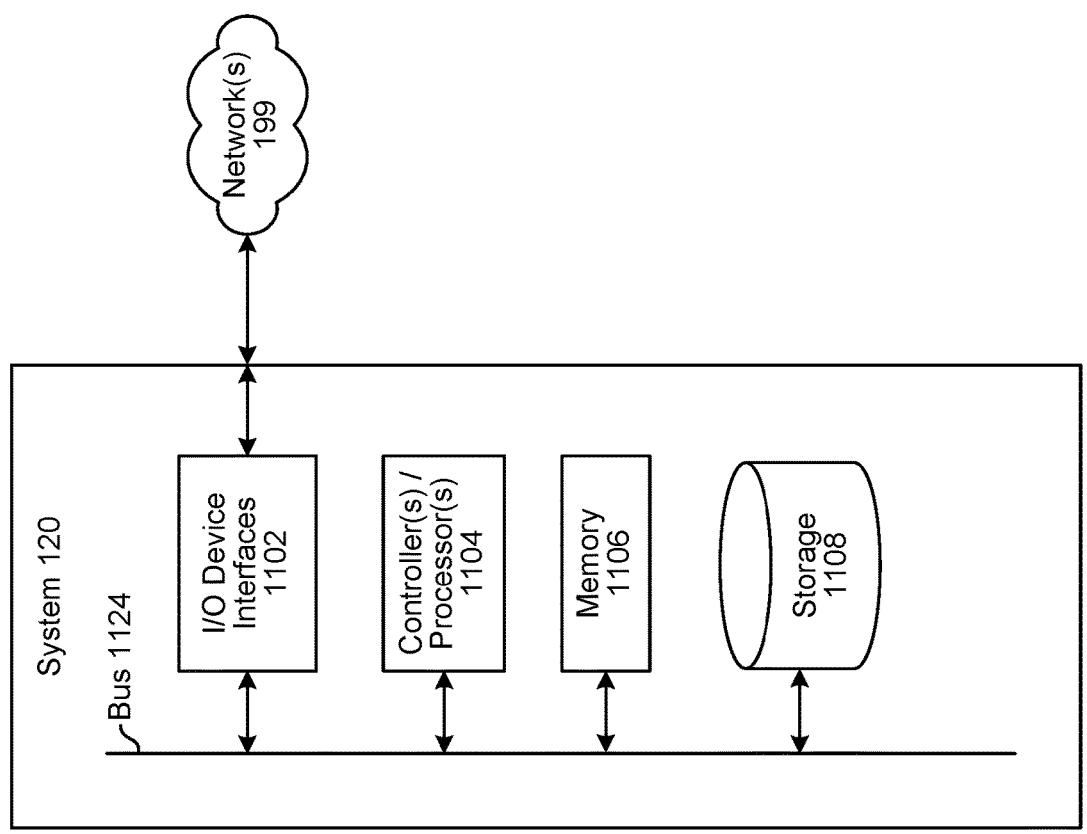
FIG. 11 is a block diagram illustrating example components of a server according to embodiments of the present disclosure.

FIG. 10 is a block diagram conceptually illustrating a device 110 that may be used with the system. FIG. 11 is a block diagram conceptually illustrating example components of the system 120, which may be one or more servers and which may assist with ASR processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device/system (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device/system (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical systems in a collection of systems or other components.

The components of the device(s) 110 and/or the system 120 may include their own dedicated processors, memory, and/or storage. Alternatively, one or more of the components of the device(s) 110 and/or the system 120 may utilize the I/O interfaces (1002/1102), processor(s) (1004/1104), memory (1006/1106), and/or storage (1008/1108) of the device(s) 110 or system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and/or the system 120 as described herein, are illustrative, and may be located as a stand-alone device or may be included, in whole or in part, as a component of a larger device or system.

Figure 12:
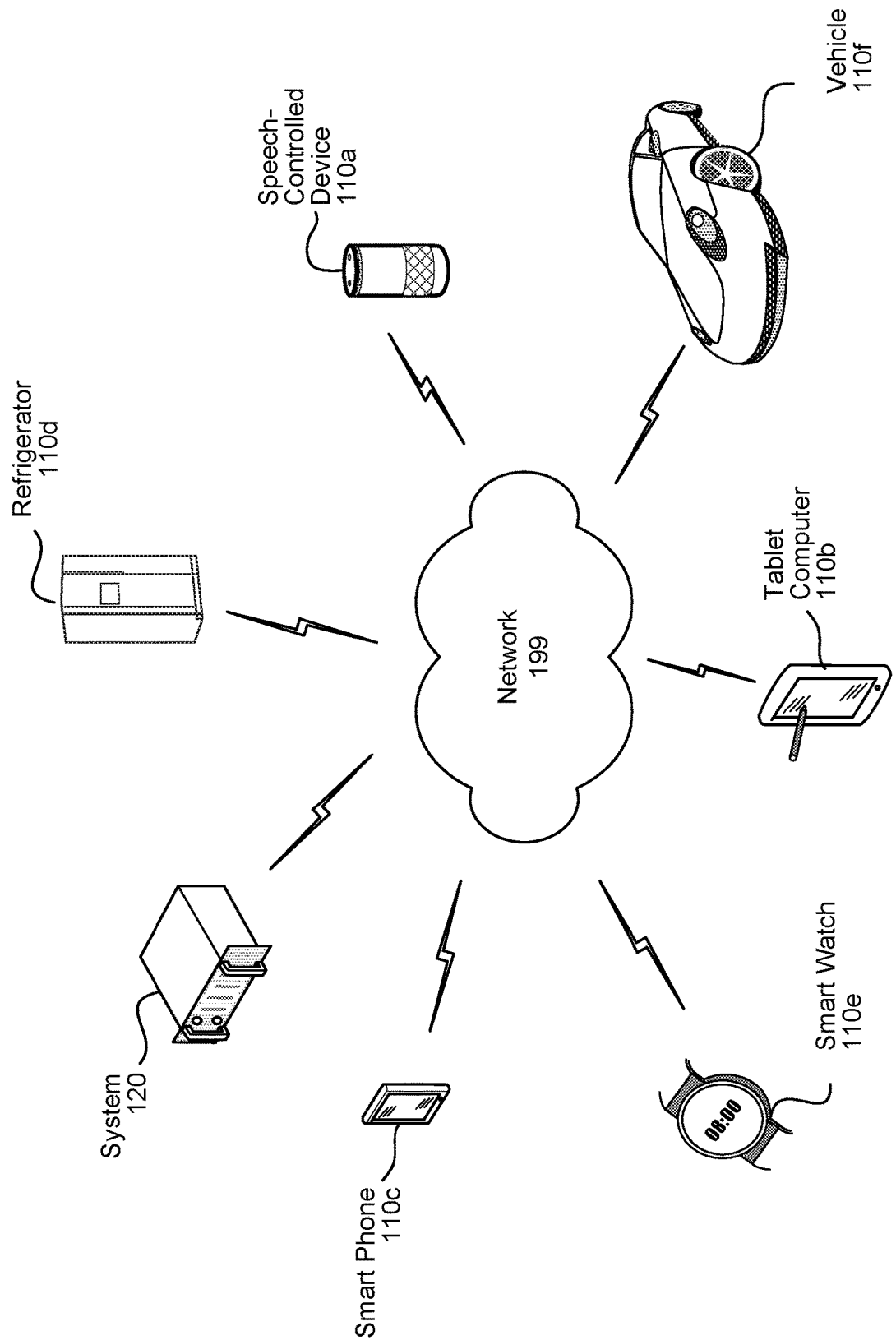
FIG. 12 illustrates an example of a computer network for use with the system according to embodiments of the present disclosure.

As illustrated in FIG. 12, multiple devices may contain components of the system 120, and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, such as a WiFi or cellular network connection or the like. Other devices are included as network-connected support devices, such as a system 120. The support devices may connect to the network 199 through a wired connection or wireless connection. Networked devices 110 may capture audio using one-or-more built-in or connected microphones or audio-capture devices, with processing performed by ASR, NLU, or other components of the same device or another device connected via network 199, such as an ASR 250 and/or NLU 260 of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for automatic speech recognition comprising:
   receiving audio data representing speech, the audio data comprising a plurality of audio frames;
   processing the plurality of audio frames to determine:
      a first audio feature vector corresponding to a first portion of the audio data,
      a second audio feature vector corresponding to a second portion of the audio data, and
      a third audio feature vector corresponding to a third portion of the audio data:
   determining that the first audio feature vector corresponds to a wakeword, the wakeword spoken by a first speaker;
   processing the second audio feature vector to determine a first encoded feature vector;
   determining first similarity data using the first audio feature vector and the first encoded feature vector, the first similarity data corresponding to a first similarity between first audio characteristics of the first portion of the audio data and second audio characteristics of the second portion of the audio data;
   processing the first similarity data to determine a first weight;
   processing, using the first weight, the first similarity data and the first encoded feature vector to determine a first data vector;
   processing the third audio feature vector to determine a second encoded feature vector;
   determining second similarity data using the first audio feature vector and the second encoded feature vector, the second similarity data corresponding to a second similarity between the first audio characteristics and third audio characteristics of the third portion of the audio data;
   processing the second similarity data to determine a second weight, the second weight being greater than the first weight;
   processing, using the second weight, the second similarity data and the second encoded feature vector to determine a second data vector;
   determining, using the first data vector and the second data vector, that the third portion of the audio data is more likely than the second portion of the audio data to have been spoken by the first speaker;
   processing the second encoded feature vector to determine text data; and
   causing a command corresponding to the text data to be executed.

2. The computer-implemented method of claim 1, wherein processing the second encoded feature vector further comprises:
   processing, using a neural network, the second data vector to create intermediate data,
   wherein determining the text data comprises normalizing the intermediate data to create normalized intermediate data, and
   wherein the second data vector is further based at least in part on the normalized intermediate data.

3. The computer-implemented method of claim 2, wherein processing the second encoded feature vector further comprises:
   determining first weight data corresponding to emphasis on the first encoded feature vector; and determining second weight data corresponding to emphasis on the intermediate data,
wherein determining the first weight comprises adding a product of the first encoded feature vector and the first weight data to a product of the intermediate data and the second weight data.

4. The computer-implemented method of claim 1, wherein determining the first similarity data further comprises:
processing the first audio feature vector to determine a third encoded feature vector; and
determining a difference between a first element of the first encoded feature vector and a second element of the third encoded feature vector.

5. A computer-implemented method comprising:
receiving first audio feature data and second audio feature data;
processing, using an encoder, the first audio feature data to determine a first encoded feature vector;
processing, using the encoder, the second audio feature data to determine a second encoded feature vector;
determining, using the first encoded feature vector and the second encoded feature vector, similarity data corresponding to a similarity between first audio characteristics of the first audio feature data and second audio characteristics of the second audio feature data;
determining a first weight based at least in part on the similarity data;
determining a data vector by processing the first weight, the similarity data and at least a portion of the second encoded feature vector; and
determining, using the data vector and a decoder, output data corresponding to the second audio feature data.

6. The computer-implemented method of claim 5, wherein determining the data vector further comprises:
determining a weight factor based at least in part on the first encoded feature vector and an output of the decoder;
processing the weight factor and the similarity data to determine a normalized weight factor; and
multiplying the second encoded feature vector and the normalized weight factor to determine the data vector.

7. The computer-implemented method of claim 5, further comprising:
receiving third audio feature data;
processing the third audio feature data to determine a third encoded feature vector;
determining, using the first encoded feature vector and the third encoded feature vector, second similarity data corresponding to a second similarity between the first audio characteristics and third audio characteristics of the third audio feature data; and
determining a second weight based at least in part on the second similarity data,
wherein, based at least in part on the first weight, at least a portion of the output data corresponds to the second encoded feature vector, and
wherein, based at least in part on the second weight, second output data does not correspond to the third encoded feature vector.

8. The computer-implemented method of claim 5, further comprising:
receiving audio data representing speech;
determining, using stored audio data representing a wakeword, that the audio data includes a representation of the wakeword;
determining a beginpoint in the audio data corresponding to a beginning of the representation of the wakeword;
determining an endpoint in the audio data corresponding to an end of the representation of the wakeword;
determining a first portion of the audio data based at least in part on the beginpoint and the endpoint; and
determining the first audio feature data based at least in part on the first portion of the audio data.

9. The computer-implemented method of claim 5, further comprising:
processing the similarity data using a sigmoid function to determine mask data,
wherein determining the data vector further comprises determining, using the mask data, to exclude at least a portion of the second encoded feature vector from the processing.

10. The computer-implemented method of claim 5, further comprising:
processing, using a language model, the output data to determine text data;
processing, using a natural-language understanding component, the text data to determine an intent; and
causing a command associated with the text data and the intent to be executed.

11. The computer-implemented method of claim 5, wherein processing the first audio feature data further comprises:
processing, using a neural network, the first audio feature data to determine first data having a first dimension; and
processing, using a downsampling function, the first data, wherein the first audio feature data has a second dimension less than the first dimension.

12. The computer-implemented method of claim 5, wherein determining the similarity data further comprises:
determining a first value corresponding to a first dimension within the first encoded feature vector;
determining a second value corresponding to the first dimension within the second encoded feature vector; and
determining a similarity value corresponding to a degree of similarity between the first value and the second value.

13. The computer-implemented method of claim 5, wherein determining the similarity data further comprises:
processing the first encoded feature vector and the second encoded feature vector using a trained model to determine the similarity data.

14. A computing system comprising:
at least one processor; and
at least one memory including instructions that, when executed by the at least one processor, cause the computing system to:
receive first audio feature data and second audio feature data;
process, using an encoder, the first audio feature data to determine a first encoded feature vector;
process, using the encoder, the second audio feature data to determine a second encoded feature vector;
determine, using the first encoded feature vector and the second encoded feature vector, similarity data corresponding to a similarity between first audio characteristics of the first audio feature data and second audio characteristics of the second audio feature data;

determine a first weight based at least in part on the similarity data;

determine a data vector by processing the first weight, the similarity data and at least a portion of the second encoded feature vector; and determine, using the data vector and a decoder, output data corresponding to the second audio feature data.

15. The computing system of claim 14, wherein the at least one memory further comprises instructions that, when executed by the at least one processor, further cause the computing system to:

determine a weight factor based at least in part on the first encoded feature vector and an output of the decoder;

process the weight factor and the similarity data to determine a normalized weight factor; and multiply the second encoded feature vector and the normalized weight factor to determine the data vector.

16. The computing system of claim 14, wherein the at least one memory further comprises instructions that, when executed by the at least one processor, further cause the computing system to:

receive third audio feature data;

process the third audio feature data to determine a third encoded feature vector;

determine, using the first encoded feature vector and the third encoded feature vector, second similarity data corresponding to a second similarity between the first audio characteristics and third audio characteristics of the third audio feature data; and determine a second weight based at least in part on the second similarity data, wherein, based at least in part on the first weight, at least a portion of the output data corresponds to the second encoded feature vector, and wherein, based at least in part on the second weight, second output data does not correspond to the third encoded feature vector.

17. The computing system of claim 14, wherein the at least one memory further comprises instructions that, when executed by the at least one processor, further cause the computing system to:

receiving audio data representing speech;

determine, using stored audio data representing a wakeword, that the audio data includes a representation of the wakeword;

determine a beginpoint in the audio data corresponding to a beginning of the representation of the wakeword;

determine an endpoint in the audio data corresponding to an end of the representation of the wakeword;

determine a first portion of the audio data based at least in part on the beginpoint and the endpoint; and determine the first audio feature data based at least in part on the first portion of the audio data.

18. The computing system of claim 14, wherein the at least one memory further comprises instructions that, when executed by the at least one processor, further cause the computing system to:

process the similarity data using a sigmoid function to determine mask data, wherein determining the data vector further comprises a determination, using the mask data, to exclude at least a portion of the second encoded feature vector from the processing.

19. The computing system of claim 14, wherein the at least one memory further comprises instructions that, when executed by the at least one processor, further cause the computing system to:

process, using a language model, the output data to determine text data;

process, using a natural-language understanding component, the text data to determine an intent; and cause a command associated with the text data and the intent to be executed.

20. The computing system of claim 14, wherein the at least one memory further comprises instructions that, when executed by the at least one processor, further cause the computing system to:

process, using a neural network, the first audio feature data to determine first data having a first dimension; and process, using a downsampling function, the first data, wherein the first audio feature data has a second dimension less than the first dimension.

* * * * *